(12) United States Patent
Hagiwara et al.

(10) Patent No.: US 12,208,793 B2
(45) Date of Patent: Jan. 28, 2025

(54) DRIVING ASSISTANCE DEVICE, VEHICLE, AND DRIVING ASSISTANCE METHOD

(71) Applicant: HONDA MOTOR CO., LTD., Tokyo (JP)

(72) Inventors: Naoya Hagiwara, Tokyo (JP); Takahiro Kurehashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 379 days.

(21) Appl. No.: 17/675,542

(22) Filed: Feb. 18, 2022

(65) Prior Publication Data
US 2022/0289178 A1 Sep. 15, 2022

(30) Foreign Application Priority Data
Mar. 10, 2021 (JP) .................................. 2021-038563

(51) Int. Cl.
*B60W 30/095* (2012.01)
*B60W 30/18* (2012.01)
(Continued)

(52) U.S. Cl.
CPC .. *B60W 30/0956* (2013.01); *B60W 30/18159* (2020.02); *B60W 40/04* (2013.01);
(Continued)

(58) Field of Classification Search
None
See application file for complete search history.

(56) References Cited

U.S. PATENT DOCUMENTS 11,878,422 B2 1/2024 Oyekanlu et al.
2018/0345960 A1* 12/2018 Fujii ................. B60W 30/0953
(Continued)

FOREIGN PATENT DOCUMENTS

JP 2006-166211 A 6/2006
JP 2008-059074 A 3/2008
(Continued)

OTHER PUBLICATIONS

Machine translation of JP218101376A (Year: 2024).*
(Continued)

*Primary Examiner* — Aniss Chad
*Assistant Examiner* — Jennifer M Anda
(74) *Attorney, Agent, or Firm* — Thomas | Horstemeyer, LLP

(57) ABSTRACT

An acquisition unit acquires data regarding a travel trajectory of another vehicle from the other vehicle. A specifying unit specifies an intersection position between the travel trajectory of the other vehicle and a travel trajectory of a self-vehicle. A setting unit setts a region based on the intersection position and the travel trajectory of the other vehicle as a monitoring region when performing driving assistance. A determination unit determines whether or not to update the monitoring region based on a result of comparison between first data that is the data used to set the monitoring region and second data that is the data acquired from the other vehicle traveling in the monitoring region. The setting unit updates the monitoring region based on the second data in a case where the determination unit determines to update the monitoring region.

10 Claims, 15 Drawing Sheets

(51) Int. Cl.
  *B60W 40/04* (2006.01)
  *H04W 4/46* (2018.01)
(52) U.S. Cl.
  CPC ...... *H04W 4/46* (2018.02); *B60W 2554/4041* (2020.02); *B60W 2556/30* (2020.02); *B60W 2556/65* (2020.02)

(56) References Cited

U.S. PATENT DOCUMENTS

2021/0197813 A1    7/2021  Houston et al.
2022/0289210 A1*  9/2022  Hagiwara ......... B60W 50/0098
2022/0371192 A1  11/2022  Oyekanlu et al.

FOREIGN PATENT DOCUMENTS

| | | | |
|---|---|---|---|
| JP | 2013-033505 A | | 2/2013 |
| JP | 2018101376 A | * | 6/2018 |

OTHER PUBLICATIONS

Japanese Office Action for Japanese Patent Application No. 2021-038559 mailed Nov. 7, 2022 (partially translated).
US Office Action for U.S. Appl. No. 17/675,012 mailed Aug. 1, 2024.

* cited by examiner

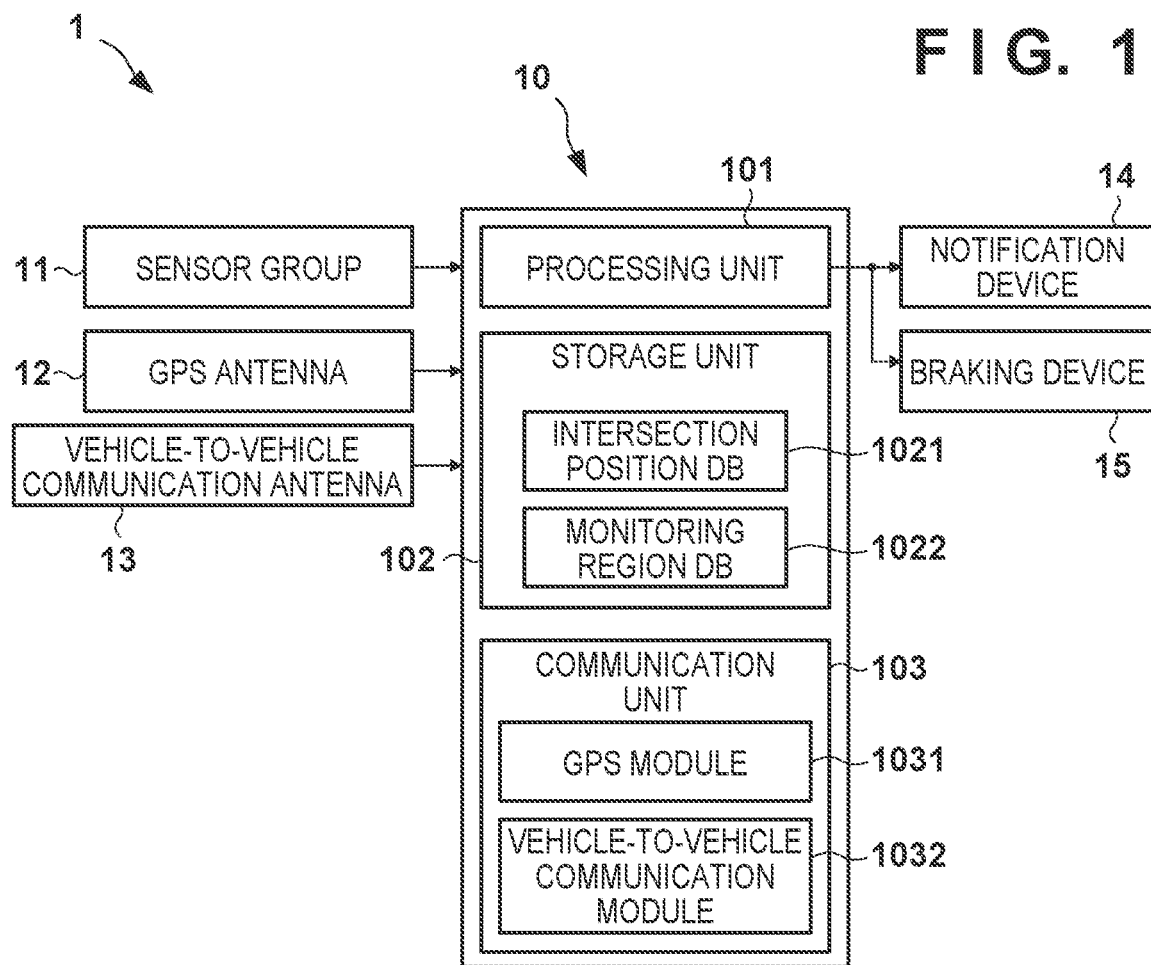

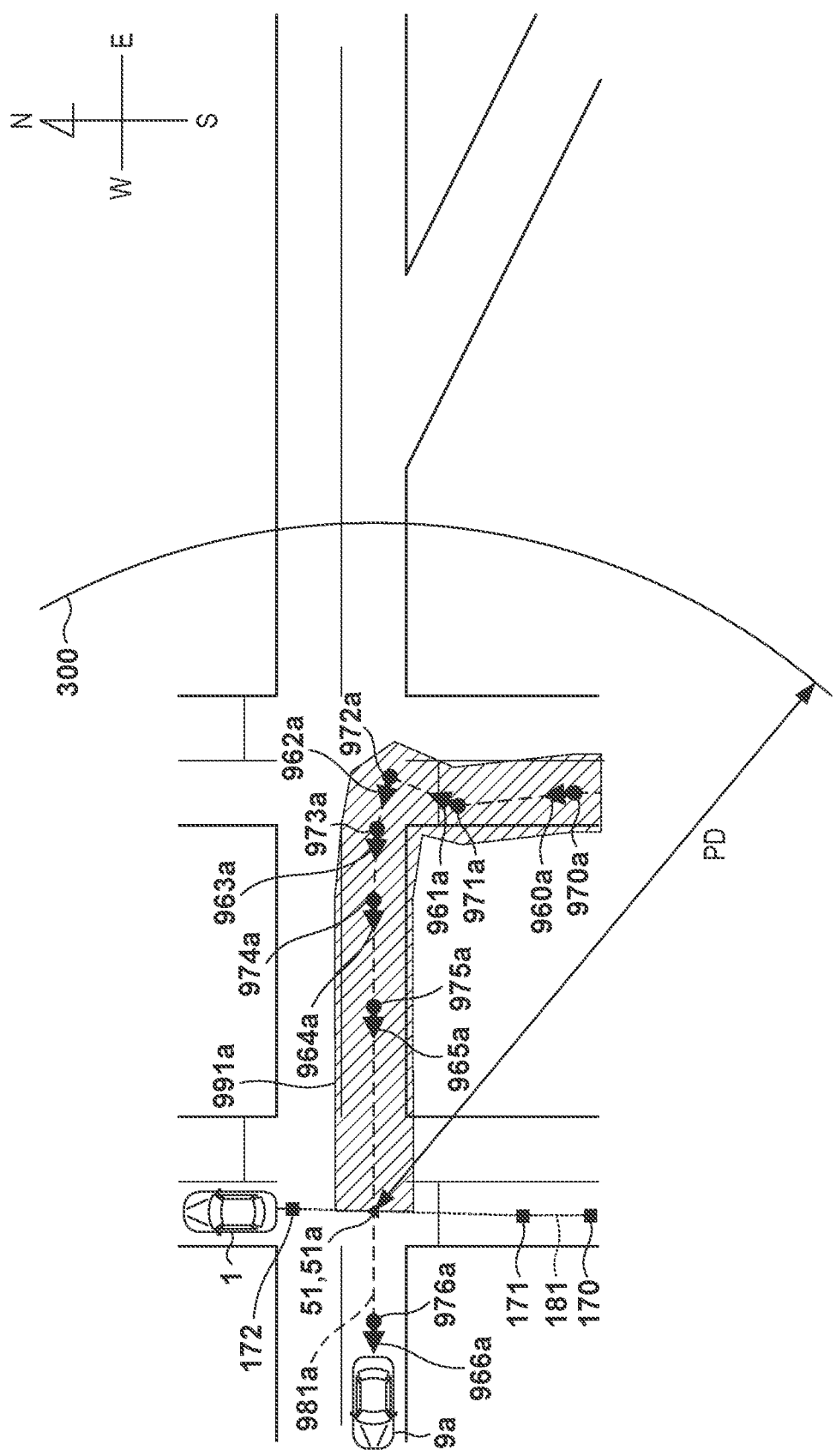

FIG. 7A

| No | TIME | POSITION | ORIENTATION | SPEED |
|---|---|---|---|---|
| 9000 | t0 | 970a(x0,y0) | 960a(350°) | v0 |
| 9001 | t1 | 971a(x1,y1) | 961a(20°) | v1 |
| 9002 | t2 | 972a(x2,y2) | 962a(285°) | v2 |
| 9003 | t3 | 973a(x3,y3) | 963a(275°) | v3 |
| 9004 | t4 | 974a(x4,y4) | 964a(270°) | v4 |
| 9005 | t5 | 975a(x5,y5) | 965a(270°) | v5 |
| 9006 | t6 | 976a(x6,y6) | 966a(270°) | v6 |

FIG. 7B

| POSITION | ORIENTATION | ANGULAR DIFFERENCE | CUMULATIVE VALUE |
|---|---|---|---|
| 51a(xc,yc) | 270° | 0° | 0° |
| 975a(x5,y5) | 965a(270°) | 0° | 10° |
| 974a(x4,y4) | 964a(270°) | 5° | 5° |
| 973a(x3,y3) | 963a(275°) | 10° | 15° |
| 972a(x2,y2) | 962a(285°) | 95° | 110° |
| 971a(x1,y1) | 961a(20°) | 30° | 140° |
| 970a(x1,y1) | 960a(350°) | — | — |

FIG. 10A

| No | TIME | POSITION | ORIENTATION | SPEED |
|---|---|---|---|---|
| 9010 | t10 | 970b(x10,y10) | 960b(270°) | v0 |
| 9011 | t11 | 971b(x11,y11) | 961b(272°) | v1 |
| 9012 | t12 | 972b(x12,y12) | 962b(265°) | v2 |
| 9013 | t13 | 973b(x13,y13) | 963b(278°) | v3 |
| 9014 | t14 | 974b(x14,y14) | 964b(270°) | v4 |
| 9015 | t15 | 975b(x15,y15) | 965b(270°) | v5 |
| 9016 | t16 | 976b(x16,y16) | 966b(270°) | v6 |

FIG. 10B

| POSITION | ORIENTATION | ANGULAR DIFFERENCE | CUMULATIVE VALUE |
|---|---|---|---|
| 51b(xc1,yc1) | 270° | 0° | 0° |
| 975b(x15,y15) | 965b(270°) | 0° | 10° |
| 974b(x14,y14) | 964b(270°) | 8° | 8° |
| 973b(x13,y13) | 963b(278°) | 13° | 21° |
| 972b(x12,y12) | 962b(265°) | 7° | 28° |
| 971b(x11,y11) | 961b(272°) | 2° | 30° |
| 970b(x11,y11) | 960b(270°) | — | — |

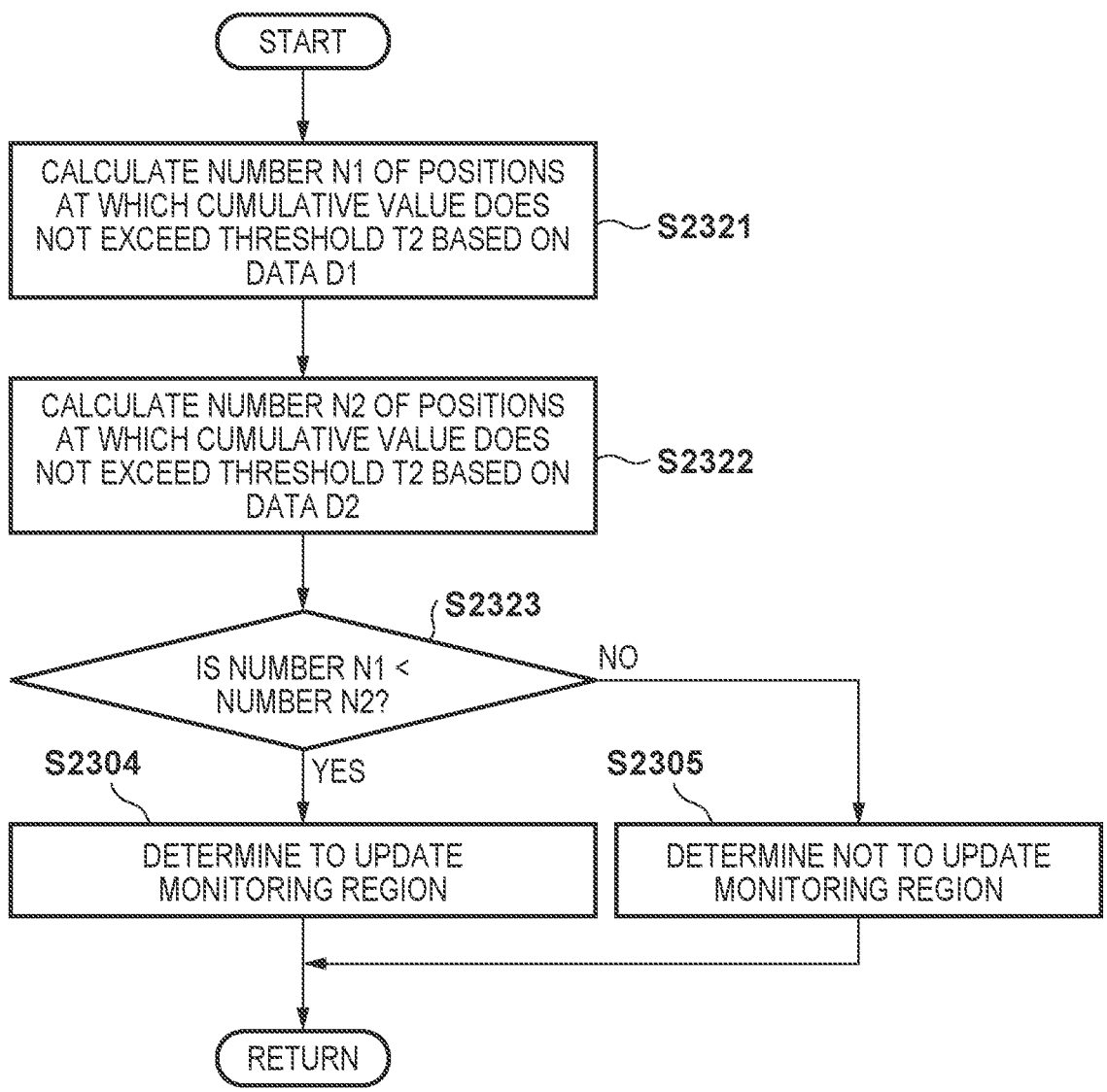

FIG. 14A

| No | TIME | POSITION | ORIENTATION | SPEED |
|---|---|---|---|---|
| 9000 | t0 | 970a(x0,y0) | 960a(350°) | v0 |
| 9001 | t1 | 971a(x1,y1) | 961a(20°) | v1 |
| 9002 | t2 | 972a(x2,y2) | 962a(285°) | v2 |
| 9003 | t3 | 973a(x3,y3) | 963a(275°) | v3 |
| 9004 | t4 | 974a(x4,y4) | 964a(270°) | v4 |
| 9005 | t5 | 975a(x5,y5) | 965a(270°) | v5 |
| 9006 | t6 | 976a(x6,y6) | 966a(270°) | v6 |

FIG. 14B

| No | TIME | POSITION | ORIENTATION | SPEED |
|---|---|---|---|---|
| 9010 | t10 | 970b(x10,y10) | 960b(270°) | v0 |
| 9011 | t11 | 971b(x11,y11) | 961b(272°) | v1 |
| 9012 | t12 | 972b(x12,y12) | 962b(265°) | v2 |
| 9013 | t13 | 973b(x13,y13) | 963b(278°) | v3 |
| 9014 | t14 | 974b(x14,y14) | 964b(270°) | v4 |
| 9015 | t15 | 975b(x15,y15) | 965b(270°) | v5 |
| 9016 | t16 | 976b(x16,y16) | 966b(270°) | v6 |

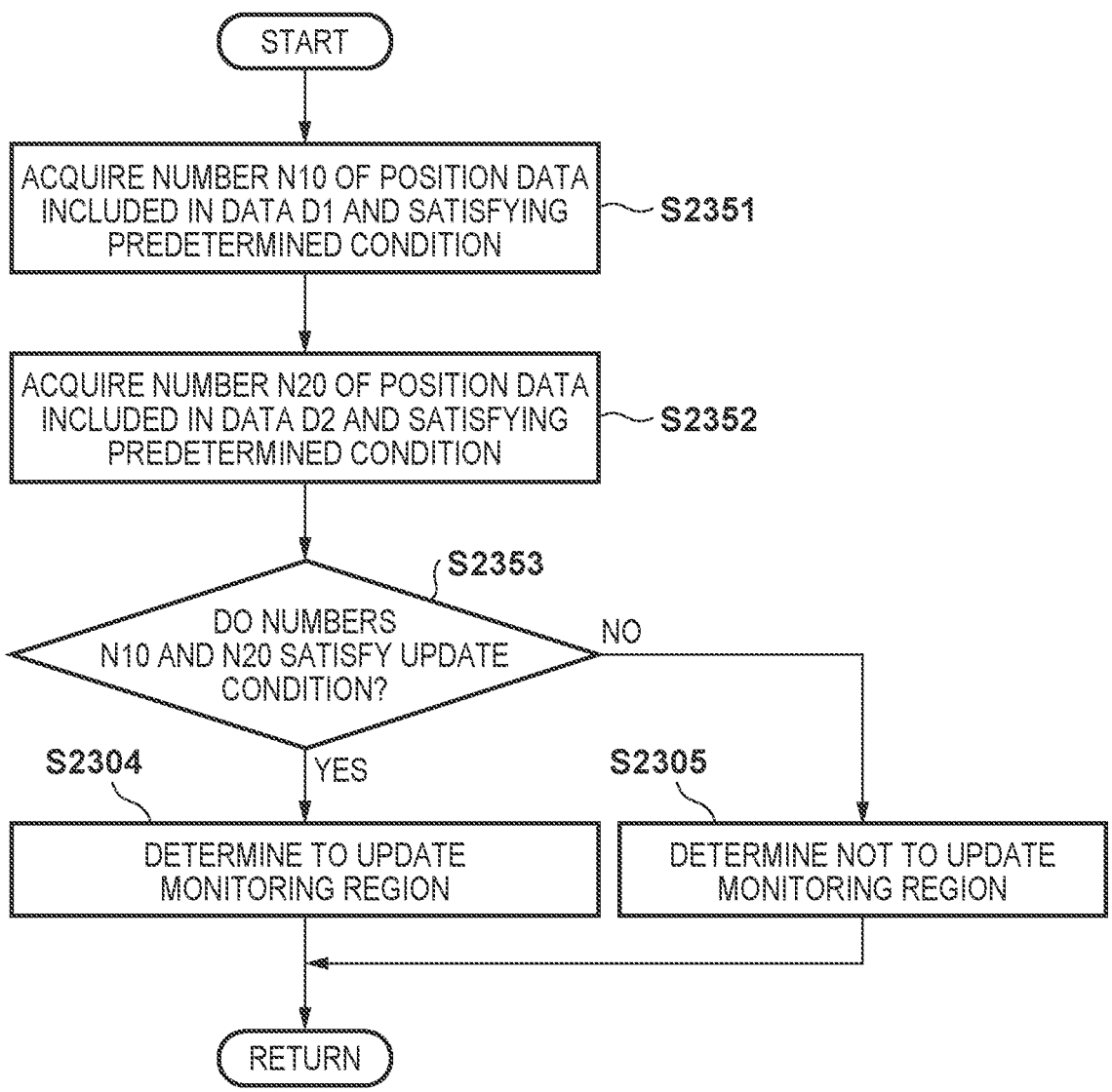

DRIVING ASSISTANCE DEVICE, VEHICLE, AND DRIVING ASSISTANCE METHOD

CROSS-REFERENCE TO RELATED APPLICATION(S)

This application claims priority to and the benefit of Japanese Patent Application No. 2021-038563 filed on Mar. 10, 2021, the entire disclosure of which is incorporated herein by reference.

BACKGROUND OF THE INVENTION

Field of the Invention

The present invention relates to a driving assistance device, a vehicle, and a driving assistance method.

Description of the Related Art

Conventionally, a device that prevents a collision with another vehicle or the like at an intersection or the like has been known. Japanese Patent Laid-Open No. 2013-033505 discloses an on-vehicle device that determines a risk of a collision with another vehicle or the like using map information.

SUMMARY OF THE INVENTION

According to one embodiment of the present invention, there is provided a driving assistance device comprising: an acquisition unit configured to acquire data regarding a travel trajectory of another vehicle from the other vehicle by vehicle-to-vehicle communication; a specifying unit configured to specify an intersection position between the travel trajectory of the other vehicle and a travel trajectory of a self-vehicle based on the data acquired by the acquisition unit; a setting unit configured to set, in a case where the intersection position is specifiable by the specifying unit, a region based on the intersection position and the travel trajectory of the other vehicle as a monitoring region when performing driving assistance; and a determination unit configured to determine, in a case where the acquisition unit acquires the data from another vehicle traveling in the monitoring region in a state in which the monitoring region is set, whether or not to update the monitoring region based on a result of comparison between first data that is the data used to set the monitoring region and second data that is the data acquired from the other vehicle traveling in the monitoring region, wherein the setting unit updates the monitoring region based on the second data in a case where the determination unit determines to update the monitoring region.

According to another embodiment of the present invention, there is provided a vehicle on which the driving assistance device according to the above embodiment.

According to still another embodiment of the present invention, there is provided a driving assistance method comprising: acquiring data regarding a travel trajectory of another vehicle from the other vehicle by vehicle-to-vehicle communication; specifying an intersection position between the travel trajectory of the other vehicle and a travel trajectory of a self-vehicle based on the data acquired in the acquiring; setting, in a case where the intersection position is specifiable in the specifying, a region based on the intersection position and the travel trajectory of the other vehicle as a monitoring region when performing driving assistance; and updating the monitoring region based on a result of comparison between first data that is data used to set the monitoring region and second data that is data newly acquired in the acquiring from the other vehicle that has passed through a predetermined region based on the intersection position.

BRIEF DESCRIPTION OF THE DRAWINGS

FIG. 1 is a diagram illustrating a configuration example of a vehicle according to an embodiment;
FIG. 2A is a diagram illustrating a configuration example of an intersection position database (DB);
FIG. 2B is a diagram illustrating a configuration example of a monitoring region DB;
FIG. 6 is a diagram illustrating a situation when the processing of FIG. 5 is performed;
FIG. 7A is a diagram illustrating data acquired from another vehicle;
FIG. 7B is a diagram illustrating an angular difference between each position of the vehicle and a previous position and a cumulative value of the angular difference;
FIG. 10A is a diagram illustrating data acquired from another vehicle;
FIG. 10B is a diagram illustrating an angular difference between each position of the vehicle and a previous position and a cumulative value of the angular difference;
FIG. 13 is a flowchart illustrating a processing example of the processing unit;
FIG. 14A is a diagram illustrating data acquired from another vehicle;
FIG. 14B is a diagram illustrating data acquired from another vehicle;
FIG. 16 is a flowchart illustrating a processing example of the processing unit.

DESCRIPTION OF THE EMBODIMENTS

Figure 3A:
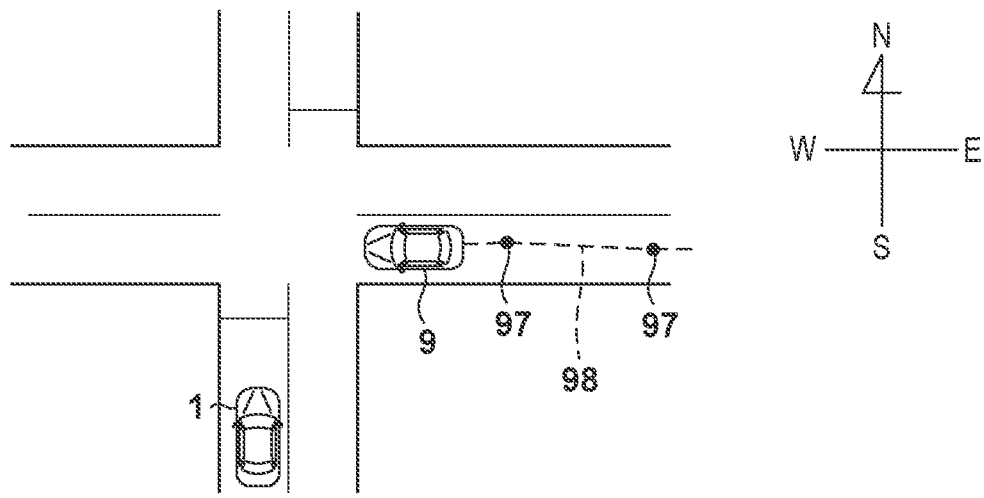
FIG. 3A is a diagram for describing setting of a monitoring region.

Meanwhile, there is a device that performs driving assistance for preventing a collision with another vehicle or the like without using map information. In such a device, for example, a monitoring region for another vehicle is set based on data acquired from the other vehicle by vehicle-to-vehicle communication, and driving assistance may be performed when the other vehicle travels in the set monitoring region. In order to improve accuracy of the driving assistance, it is desirable to appropriately set the monitoring region.

An embodiment of the present invention provides a technique for appropriately setting a monitoring region in driving assistance.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

1. Overall Configuration (FIGS. 1 to 2B)

FIG. 1 is a diagram illustrating a configuration example of a vehicle 1 according to an embodiment. Note that FIG. 1 illustrates a configuration related to features of embodiments to be described later. The vehicle 1 is a vehicle capable of performing driving assistance for preventing a collision with another vehicle or the like without using map information by a control to be described later. The vehicle 1 includes a control device 10, a sensor group 11, a global positioning system (GPS) antenna 12, a vehicle-to-vehicle communication antenna 13, a notification device 14, and a braking device 15.

The control device 10 is, for example, an electronic control unit (ECU), and functions as a driving assistance device that performs a driving assistance control. Although details will be described later, in the present embodiment, the control device 10 performs a driving assistance control by vehicle-to-vehicle communication with another vehicle and processing in the self-vehicle without performing server communication or the like. The control device 10 includes a processing unit 101, a storage unit 102, and a communication unit 103, which are connected by a bus (not illustrated).

The processing unit 101 is a processor as typified by a central processing unit (CPU), and executes a program stored in the storage unit 102. The storage unit 102 is a random access memory (RAM), a read only memory (ROM), a hard disk drive, or the like and stores various data in addition to the program executed by the processing unit 101. The communication unit 103 is a communication interface for communication with an external device.

In the present embodiment, an intersection position database (DB) 1021 and a monitoring region DB 1022 are constructed as databases for performing driving assistance in the storage unit 102.

FIG. 2A is a diagram illustrating a configuration example of the intersection position DB 1021. The intersection position DB 1021 stores information regarding an intersection position registered by processing to be described later. In the present embodiment, the intersection position DB 1021 stores an intersection position ID, a registration date and time, position information, and an entry azimuth in association with each other for each intersection position.

The intersection position ID is an identification number of each intersection position. The registration date and time is a date and time when a target intersection position is registered in the intersection position DB 1021. The position information is information indicating the intersection position, and is indicated by, for example, latitude and longitude. Furthermore, the position information may include information regarding a height such as altitude. The entry azimuth is an azimuth (angle) at which the vehicle 1 is directed at the time of entering the intersection position when the intersection position is registered. In the present embodiment, the azimuth of entry to the intersection is registered with the north direction set to 0°, the east direction set to 90°, the south direction set to 180°, and the west direction set to 270°.

Note that the information stored in the intersection position DB 1021 as illustrated in FIG. 2A is an example, and the information included in the intersection position DB 1021 can be changed as appropriate. In the following description, the intersection position registered in the intersection position DB 1021 may be referred to as a registered intersection position.

FIG. 2B is a diagram illustrating a configuration example of the monitoring region DB 1022. The monitoring region DB 1022 stores information regarding a monitoring region set by processing to be described later. Here, the monitoring region is a region to be monitored for another vehicle when the control device 10 performs driving assistance. That is, the control device 10 performs driving assistance when another vehicle is traveling in the monitoring region. In the present embodiment, the monitoring region DB 1022 stores a monitoring region ID, an intersection position ID, and monitoring region setting information in association with each other for each monitoring region.

The monitoring region ID is an identification number of each monitoring region. In the present embodiment, since the monitoring region is set for the registered intersection position, the monitoring region DB 1022 also includes the intersection position ID of the intersection position corresponding to the monitoring region specified by the monitoring region ID. Monitoring region information is information for setting the monitoring region. For example, the monitoring region information includes time series data of a position of another vehicle used for setting the monitoring region.

The communication unit 103 includes a GPS module 1031 that receives position information and the like of the vehicle 1 from an artificial satellite (GPS satellite) via the GPS antenna 12, and a vehicle-to-vehicle communication module 1032 that receives information from another vehicle via the vehicle-to-vehicle communication antenna 13.

Note that the function of the control device 10 can be implemented by either hardware or software. For example, the function of the control device 10 may be implemented by a central processing unit (CPU) executing a predetermined program using a memory. For example, at least some of the functions of the control device 10 may be implemented by a known semiconductor device such as a programmable logic device (PLD) or an application specific integrated circuit (ASIC). In addition, here, the control device 10 is described as a single element, but the control device 10 may be divided into two or more elements as necessary.

The sensor group 11 includes various sensors mounted on the vehicle 1 and necessary for driving assistance. For example, the sensor group 11 can include an acceleration sensor that detects the acceleration of the vehicle 1, a vehicle speed sensor that detects the speed of the vehicle 1, and the like. Furthermore, for example, the sensor group 11 can include an outside detection sensor such as a camera capable of detecting an object around the vehicle 1, a millimeter wave radar, or a light detection and ranging (LIDAR). The sensor group 11 outputs a detection result to the control device 10.

The GPS antenna 12 receives radio waves for position measurement transmitted from a GPS satellite. The vehicle-to-vehicle communication antenna 13 is an antenna that transmits and receives various data to and from another vehicle. For example, the vehicle-to-vehicle communication antenna 13 may receive data regarding a travel trajectory of another vehicle from the other vehicle.

The notification device 14 is a device that makes a notification for an occupant. For example, the notification device 14 includes a display unit such as a display, and makes a notification for the occupant by displaying information such as a possibility of a collision with another vehicle on the display unit. Furthermore, for example, the notification device 14 includes a voice output unit such as a speaker, and notifies of information such as a possibility of a collision by voice.

The braking device 15 is, for example, a brake, and is a device for performing a braking operation of the vehicle 1. When there is a possibility that the vehicle 1 collides with another vehicle, as driving assistance, the control device 10 may operate the braking device 15 to avoid the collision with another vehicle.

2. Outline of Operation of Control Device 10 (FIGS. 3A to 4B)

In the present embodiment, the control device 10 of the vehicle 1 performs driving assistance without using the map information. Here, the operation performed by the control device 10 is mainly divided into setting of the monitoring region and execution of driving assistance. Specifically, the control device 10 specifies the intersection position where a travel trajectory of the vehicle 1, which is the self-vehicle, and the travel trajectory of another vehicle intersect, and sets the monitoring region based on the specified intersection position. Then, when the vehicle 1 approaches the specified intersection position, the control device 10 performs driving assistance with another vehicle traveling in the monitoring region as a monitoring target. The outline of the setting of the monitoring region and the driving assistance will be described below.

2.1. Setting of Monitoring Region

Figure 3B:
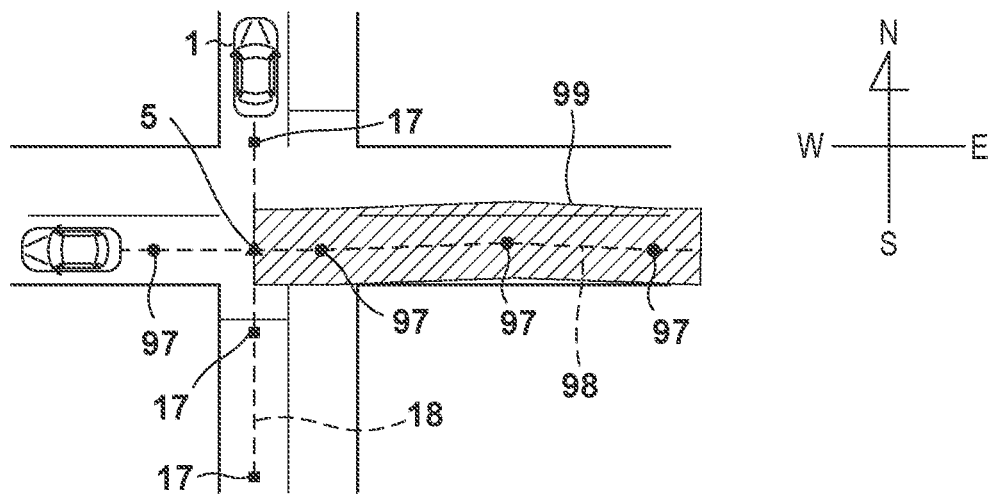
FIG. 3B is a diagram for describing the setting of the monitoring region.

FIGS. 3A and 3B are diagrams for describing the setting of the monitoring region. Here, a case where the travel trajectory of the vehicle 1 that is the self-vehicle and the travel trajectory of a vehicle 9 that is another vehicle intersect will be described.

FIG. 3A illustrates a state before the travel trajectories of the vehicle 1 and the vehicle 9 intersect. Specifically, FIG. 3A illustrates a state in which the vehicle 9 is about to cross the front of the vehicle 1 in a state in which the vehicle 1 is stopped before a stop line.

FIG. 3B illustrates a state after the travel trajectories of the vehicle 1 and the vehicle 9 intersect. Details will be described later, and the control device 10 specifies an intersection position 5 between the travel trajectory of the vehicle 9 and the travel trajectory of the vehicle 1. For example, the control device 10 calculates a travel trajectory 98 of the vehicle 9 based on information regarding a plurality of positions 97 acquired from the vehicle 9. In addition, the control device 10 calculates a travel trajectory 18 of the vehicle 1 based on information regarding a plurality of positions 17 of the vehicle 1 acquired via the GPS antenna 12. Then, an intersection between the travel trajectory 98 and the travel trajectory 18 is specified as the intersection position 5. In addition, the control device 10 stores information regarding the specified intersection position 5 in the intersection position DB 1021.

In addition, FIG. 3B illustrates a monitoring region 99 set based on the travel trajectory and the intersection position 5 of the vehicle 9. As will be described in detail later, the control device 10 sets, as the monitoring region 99, a region having a predetermined width around the travel trajectory 98 in a portion in front of the intersection position 5 of the travel trajectory 98. The predetermined width may be set to, for example, several meters in consideration of a general lane width. In addition, the control device 10 stores information regarding the set monitoring region 99 in the monitoring region DB 1022.

2.2. Driving Assistance

Figure 4A:
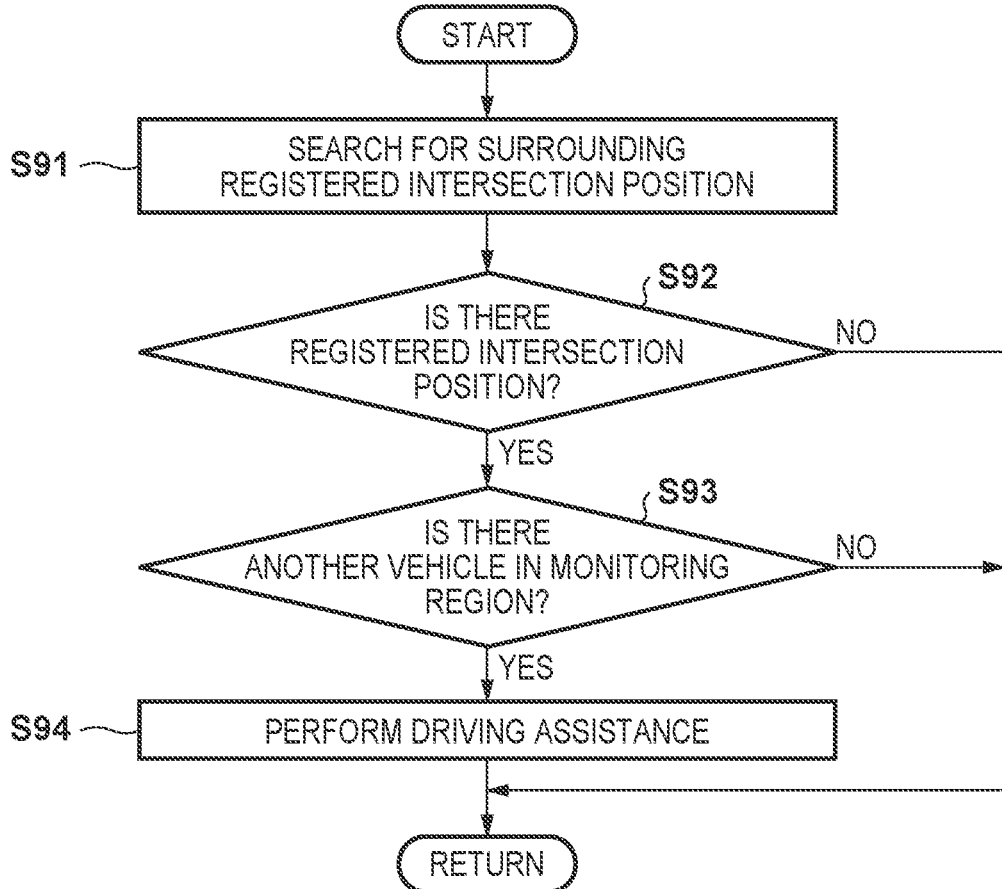
FIG. 4A is a flowchart illustrating a processing example of a processing unit.

FIG. 4A is a flowchart illustrating a processing example of the processing unit 101. FIG. 4A illustrates a processing example of the processing unit 101 when performing driving assistance. For example, this flowchart is implemented by the processing unit 101 reading and executing a program stored in the storage unit 102. Further, for example, this flowchart is repeatedly executed while the vehicle 1 is traveling.

Figure 4B:
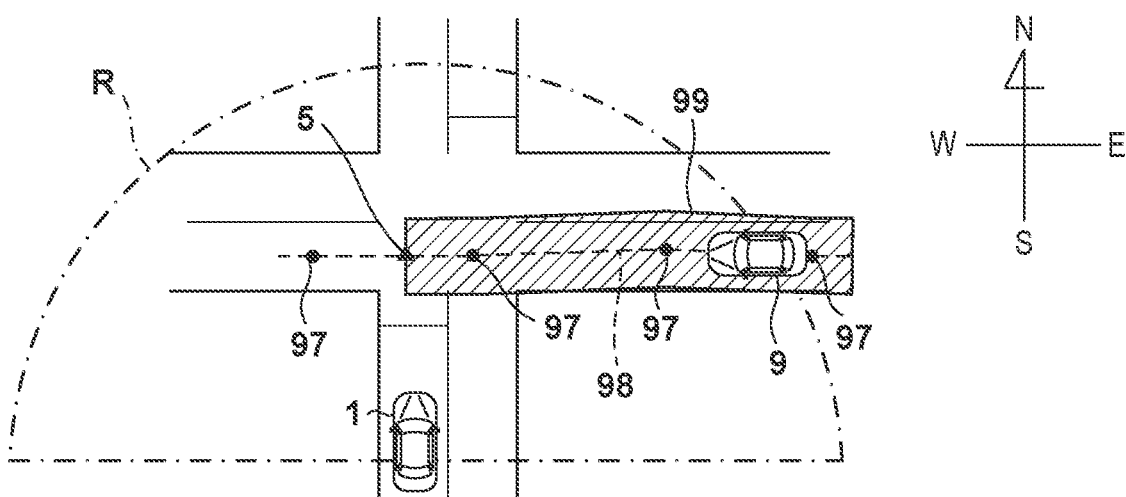
FIG. 4B is a diagram illustrating an example of a situation in which driving assistance of the vehicle is performed.

FIG. 4B is a diagram illustrating an example of a situation in which driving assistance of the vehicle 1 is performed. Here, a situation in which the vehicle 1 enters the intersection registered in the intersection position DB 1021 is illustrated.

In Step S91 (hereinafter, simply referred to as S91, and the same applies to other steps), the processing unit 101 searches for a registered intersection position around the vehicle 1. For example, the processing unit 101 searches for a registered intersection position within a predetermined range from the vehicle 1 based on the current position of the vehicle 1 acquired by the GPS module 1031 and position information regarding the intersection position registered in the intersection position DB 1021. In the situation illustrated in FIG. 4B, the processing unit 101 searches for an intersection position that is registered in the intersection position DB 1021 and that is within a search range R in front of or on the side of the vehicle 1.

In S92, the processing unit 101 proceeds to S93 in a case where there is a registered intersection position around the vehicle 1 based on the search result of S91, and ends the flowchart in a case where there is no registered intersection position around the vehicle 1. In the situation illustrated in FIG. 4B, since the intersection position 5 is included in the search range R, the processing unit 101 proceeds to S93.

In S93, the processing unit 101 checks whether or not there is another vehicle in the monitoring region, and in a case where there is another vehicle, the processing unit 101 proceeds to S94, and in a case where there is no other vehicle, the processing unit ends the flowchart. For example, the processing unit 101 checks whether or not there is another vehicle in the monitoring region based on position information of another vehicle acquired by the vehicle-to-vehicle communication module 1032 through vehicle-to-vehicle communication. For example, the processing unit 101 checks whether or not there is another vehicle in the monitoring region based on a detection result of the outside detection sensor capable of detecting an object around the vehicle 1. In the situation illustrated in FIG. 4B, since the vehicle 9 is traveling in the monitoring region 99, the processing unit 101 proceeds to S94.

In S94, the processing unit 101 performs driving assistance. For example, the processing unit 101 determines a possibility of a collision between the vehicle 1 and the vehicle 9 based on information such as the position and speed of the vehicle 1, which is the self-vehicle, and the position and speed of the vehicle 9, which is another vehicle. Then, in a case where the possibility of the collision exceeds a threshold, the processing unit 101 causes the notification device 14 to notify the occupant that there is a possibility of a collision. Alternatively, in a case where the possibility of the collision exceeds the threshold, the processing unit 101 may cause the braking device 15 to perform an emergency stop or the like of the vehicle 1. Note that a known technique can be appropriately adopted as an aspect of driving assistance.

As described above, in the present embodiment, the control device 10 is configured to be able to perform driving assistance in a case where another vehicle is present in the monitoring region. Therefore, the control device 10 can perform driving assistance based on the set monitoring region. In addition, since the control device 10 makes, as driving assistance, a notification for the occupant of the self-vehicle, it is possible to urge the occupant to grasp the surrounding situation of the self-vehicle.

3. Control Example (FIGS. 5 to 8)

3.1. Monitoring Region Setting Processing

Figure 5:
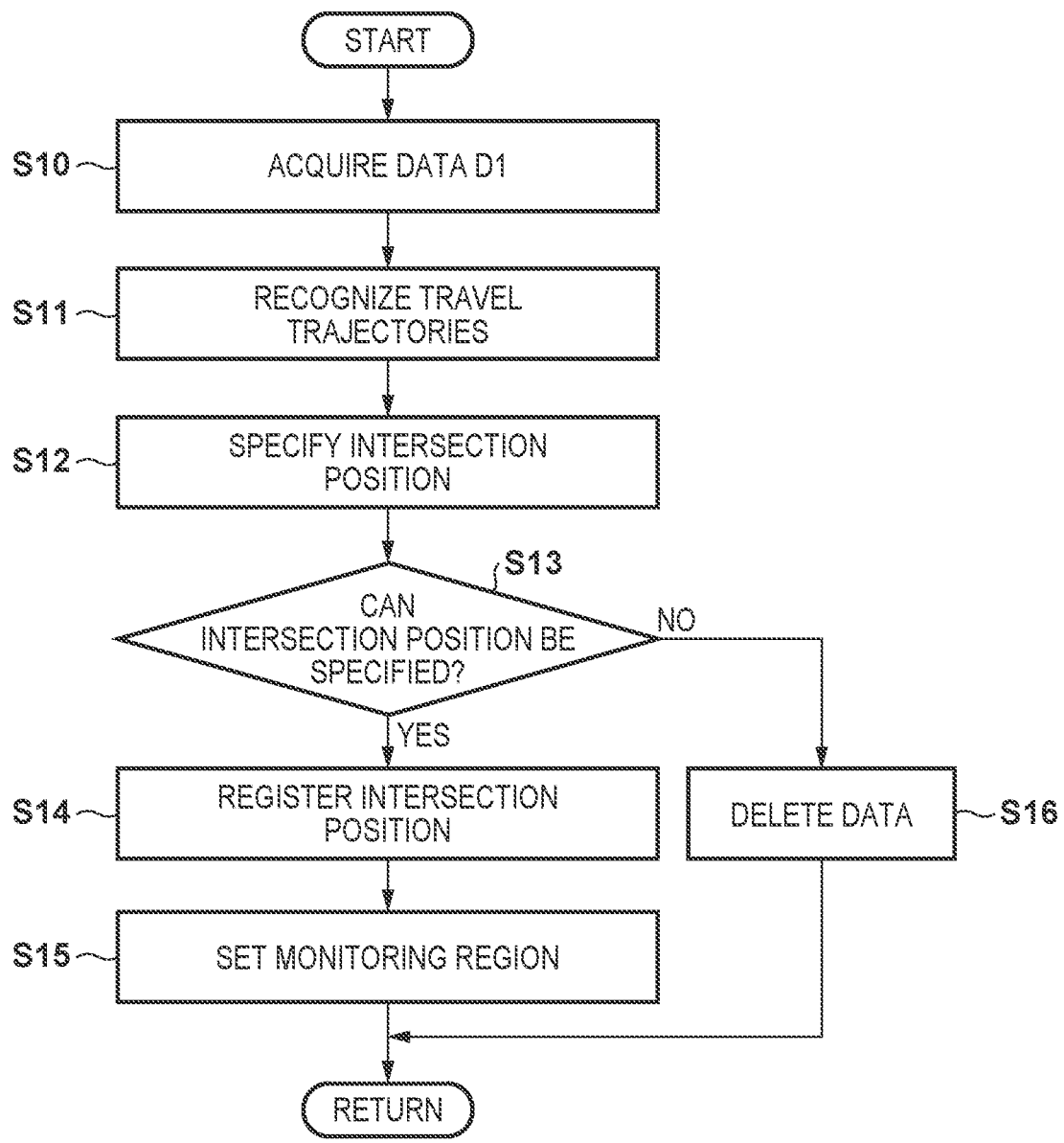
FIG. 5 is a flowchart illustrating a processing example of the processing unit.

FIG. 5 is a flowchart illustrating a processing example of the processing unit 101, and illustrates a processing example of intersection position registration processing. FIG. 6 is a diagram illustrating a situation when the processing of FIG. 5 is performed. For example, the flowchart of FIG. 5 is implemented by the processing unit 101 reading and executing a program stored in the storage unit 102. In addition, for example, this flowchart is repeatedly performed while the vehicle 1 is traveling, and can be performed in parallel with the processing when performing driving assistance illustrated in FIG. 4A.

In S10, the processing unit 101 acquires data D1, which is data of another vehicle. Furthermore, the processing unit 101 acquires data regarding the travel trajectory of another vehicle from the other vehicle by vehicle-to-vehicle communication. For example, the vehicle 9, which is the other vehicle, transmits data regarding the travel trajectory to the surrounding vehicle and the like on a predetermined cycle by vehicle-to-vehicle communication. The processing unit 101 receives data regarding the travel trajectory periodically transmitted from the surrounding vehicle 9. FIG. 7A is a diagram illustrating the data D1 acquired from another vehicle. In FIG. 7A, data regarding positions 970a to 976a of a vehicle 9a and orientations 960a to 966a of the vehicle 9a at times t0 to t6 is included in the data D1 (see FIG. 6). That is, the data D1 acquired by the processing unit 101 in S10 may include data indicating the position of another vehicle and the orientation of the other vehicle at the position in time series. In addition, in FIG. 7A, data regarding vehicle speeds v0 to v6 of the vehicle 9a at the times t0 to t6 is included. In addition, data regarding whether or not a turn signal is lighted may be included. The processing unit 101 temporarily stores the acquired data D1 in the storage unit 102. Note that the processing unit 101 ends the flowchart in a case where data cannot be acquired from another vehicle due to the absence of another vehicle in the vicinity or the like.

Note that, in the present embodiment, the data indicating the position, orientation, and the like in time series is data regarding the position and orientation acquired at a shorter time interval when the vehicle 9 travels on a curve than when the vehicle 9 travels straight. Therefore, when the vehicle 9 travels on a curve, for example, when the vehicle 9 is traveling in a section of the positions 971a to 974a, the data acquisition interval is shorter than that in other regions. As a result, more pieces of position information can be acquired at the time of traveling on a curve in which accuracy in acquiring the position information may decrease, and thus, it is possible to suppress a decrease in accuracy of a travel trajectory 981.

In the present embodiment, in the example illustrated in FIG. 7A, data indicating a total of seven positions corresponding to the positions 970a to 976a is included. However, the number of data indicating the position included in the data D1 can be appropriately set. In addition, the number of data indicating the position included in the data D1 may vary. For example, in a case where a time at which the data D1 is transmitted by the vehicle 9 is set as a reference time, data indicating a position acquired within a predetermined period up to the reference time may be included in the data D1. In this case, when the data indicating the position, the orientation, and the like of the vehicle 9 is acquired at a shorter time interval when the vehicle 9 travels on a curve than when the vehicle 9 travels straight, the number of data indicating the position included in the data D1 decreases as the travel trajectory 98 of the vehicle 9 is straight.

As another aspect in which the number of data indicating the position included in the data D1 varies, in a case where a position where the data D1 is transmitted by the vehicle 9 is set as a reference position, the data D1 may include data indicating a position acquired at a position within a predetermined distance from a reference position. In this case, when the data indicating the position, the orientation, and the like of the vehicle 9 is acquired at a shorter time interval when the vehicle 9 travels on a curve than when the vehicle 9 travels straight, the number of data indicating the position included in the data D1 decreases as the travel trajectory 98 of the vehicle 9 is straight. p In S11, the processing unit 101 recognizes travel trajectories of the vehicle 1 and the vehicle 9a. For example, the processing unit 101 calculates a travel trajectory 981a of the vehicle 9a based on the data D1 acquired in S10. More specifically, the processing unit 101 recognizes the travel trajectory 981a of the vehicle 9a by drawing a straight line connecting to each of the positions 970a to 976a of the vehicle 9a acquired in S10 in time series. In addition, the processing unit 101 calculates a travel trajectory 181 of the self-vehicle based on the data acquired from the GPS module 1031 or the sensor group 11. For example, the processing unit 101 may acquire the data from the GPS module 1031 or the sensor group 11 on a predetermined cycle to recognize the position of the vehicle 1 in time series and calculate the travel trajectory 181 of the vehicle 1. More specifically, the processing unit 101 recognizes the travel trajectory 181 by drawing a straight line connecting to each of acquired positions 170 to 172 of the vehicle 1 in time series.

In S12, the processing unit 101 specifies an intersection position. The processing unit 101 specifies the intersection position of the vehicle 1 and the vehicle 9a based on the travel trajectories of the vehicle 1 and the vehicle 9a recognized in S11. That is, the processing unit 101 specifies the intersection position between the travel trajectory of another vehicle and the travel trajectory of the self-vehicle based on the data D1 acquired in S11. Specifically, the processing unit 101 may specify an intersection position 51 by obtaining coordinates (latitude and longitude) of an intersection between the straight line connecting the positions 970a to 976a of the vehicle 9a acquired in S11 in time series and the straight line connecting the positions 170 to 172 of the vehicle 1 in time series.

In S13, the processing unit 101 proceeds to S14 in a case where the intersection position can be specified in S12, and the processing unit 101 proceeds to S16 in a case where the intersection position cannot be specified.

In S14, the processing unit 101 registers information regarding the specified intersection position in the intersection position DB 1021 of the storage unit 102.

In S15, the processing unit 101 sets the monitoring region. Specifically, in a case where the intersection position can be specified in S12, the processing unit 101 sets a region based on the intersection position and the travel trajectory of another vehicle as the monitoring region when performing driving assistance. In the example of FIG. 6, the processing unit 101 sets, as a monitoring region 991a, a region having a predetermined width in a portion in front of an intersection position 51a of the travel trajectory 981a of the vehicle 9a.

In S16, the processing unit 101 deletes the data D1 temporarily stored in the storage unit 102. That is, in a case where the intersection position cannot be specified in S12, the processing unit 101 deletes the entire data acquired in S10. Thereafter, the processing unit 101 ends the flowchart.

By the way, in a case where the position information of the vehicle that is traveling is acquired by GPS or the like, noise is likely to occur in position data when the vehicle travels on a curve than when the vehicle travels straight, and the accuracy of the acquired position may be relatively low. Therefore, in order to appropriately set the monitoring region 99, it is basically desirable to adopt a straighter travel trajectory 98 used for setting the monitoring region 99. Therefore, even in a case where the monitoring region 99 has already been set, when a travel trajectory 98 of another vehicle that is straighter than the travel trajectory 98 used for setting the monitoring region 99 is newly obtained, the monitoring region 99 is updated based on the newly obtained travel trajectory 98, whereby the monitoring region 99 can be appropriately set. Therefore, in the present embodiment, the processing unit 101 performs monitoring region update processing.

3.2. Monitoring Region Update Processing

Figure 8:
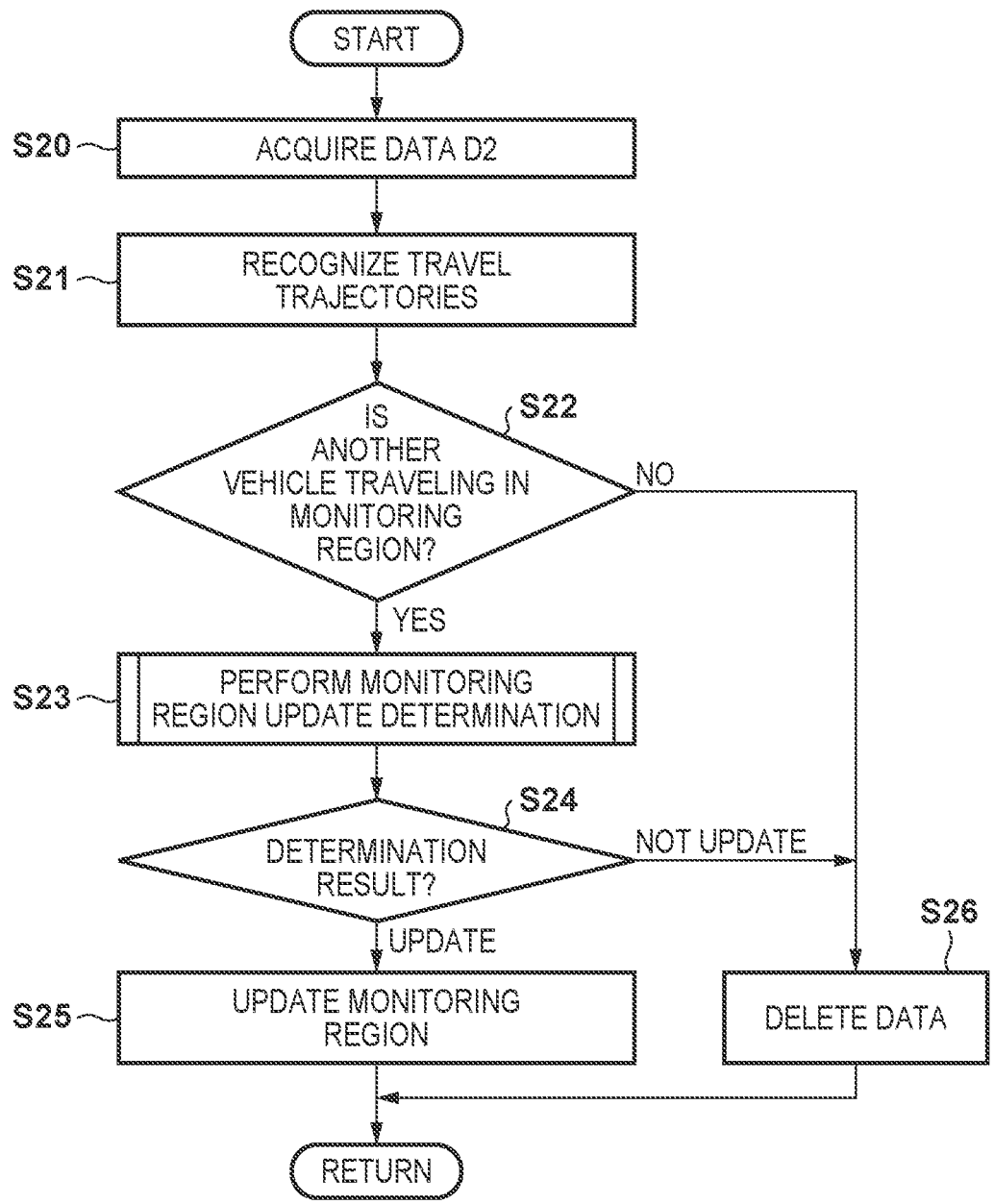
FIG. 8 is a flowchart illustrating a processing example of the processing unit.
Figure 9:
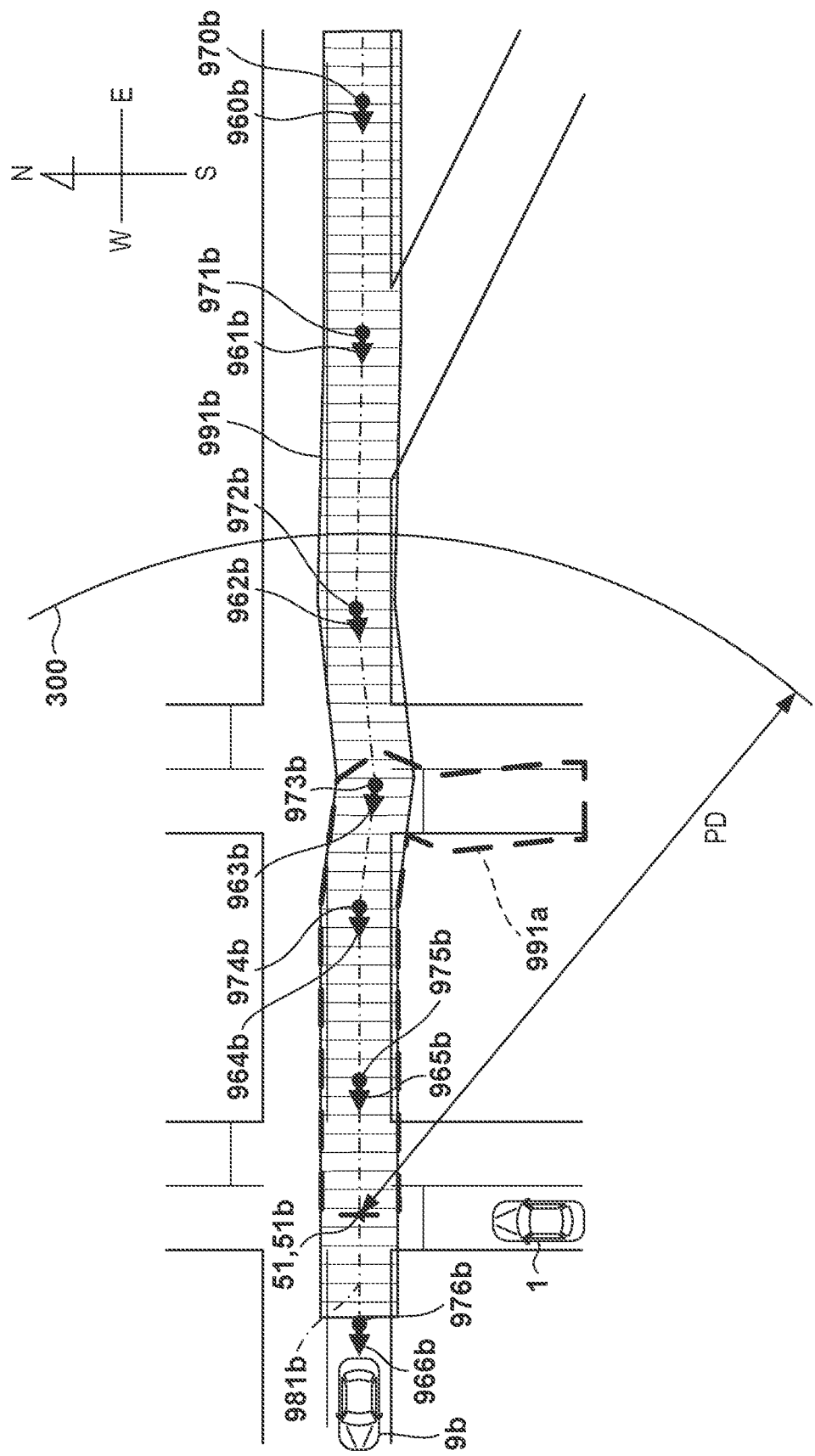
FIG. 9 is a diagram illustrating a situation when the processing of FIG. 8 is performed.

FIG. 8 is a flowchart illustrating a processing example of the processing unit 101, and illustrates a processing example of the monitoring region update processing. FIG. 9 is a diagram illustrating a situation when the processing of FIG. 8 is performed. Specifically, FIG. 9 illustrates a situation in which another vehicle 9b different from that at the time of setting the monitoring region travels on the set travel trajectory 981a when the vehicle 1 enters the intersection position where the monitoring region is set.

For example, the flowchart of FIG. 8 is implemented by the processing unit 101 reading and executing a program stored in the storage unit 102. In addition, for example, this flowchart is repeatedly performed while the vehicle 1 is traveling, and can be performed in parallel with the processing illustrated in FIG. 4A or 5.

In S20, the processing unit 101 acquires data D2 which is data of another vehicle by vehicle-to-vehicle communication. FIG. 10A is a diagram illustrating the data D2 acquired from another vehicle. In FIG. 10A, data regarding positions 970b to 976b of the vehicle 9b and orientations 960b to 966b of the vehicle 9b at times t10 to t16 is included in the data D2 (see FIG. 9). That is, the data D2 acquired by the processing unit 101 in S20 may include data indicating the position of another vehicle and the orientation of the other vehicle at the position in time series, similarly to the data D1. In addition, the data D2 may appropriately include data regarding the vehicle 9b similarly to the data D1.

In S21, the processing unit 101 recognizes a travel trajectory 981b of the vehicle 9b. For example, the processing unit 101 calculates the travel trajectory 981b of the vehicle 9b based on the data D2 acquired in S20. More specifically, the processing unit 101 recognizes the travel trajectory 981b by drawing a straight line connecting the positions 970b to 976b of the vehicle 9b acquired in S20 in time series.

In S22, the processing unit 101 checks whether or not the vehicle 9b, which is another vehicle, is traveling (has been traveling) on the currently set travel trajectory 981a. In a case where the vehicle 9b is traveling on the travel trajectory 981a, the processing unit 101 proceeds to S23, and in a case where the vehicle 9b is not traveling on the travel trajectory 981a, the processing unit 101 proceeds to S26.

In S23, the processing unit 101 performs monitoring region update determination. Specifically, the processing unit 101 determines whether or not to update the monitoring region based on a result of comparison between the data D1 at the time of setting the monitoring region 991a and the newly acquired data D2. That is, in a case where the data D2 is acquired from the vehicle 9b traveling in the monitoring region 991a in a state in which the monitoring region 991a is set, the processing unit 101 determines whether or not to update the monitoring region based on the result of comparison between the data D1 and the data D2. A specific processing example of this step will be described later.

In S24, the processing unit 101 proceeds to S25 in a case where the determination result in S23 is "updating" the monitoring region, and the processing unit 101 proceeds to S26 in a case where the determination result in S23 is "not updating" the monitoring region.

In S25, the processing unit 101 updates the monitoring region. Specifically, based on the travel trajectory 981b of the vehicle 9b, the processing unit 101 sets, as a new monitoring region 991b, a region having a predetermined width in a portion in front of the intersection position 51 of the travel trajectory 981a of the vehicle 9a. For example, the processing unit 101 deletes data regarding the monitoring region 991a based on the data D1 registered in the monitoring region DB 1022, and stores data regarding the monitoring region 991b based on the data D2 in the monitoring region DB 1022. As described above, in a case where it is determined to update the monitoring region, the processing unit 101 updates the monitoring region based on the data D2.

Figure 11:
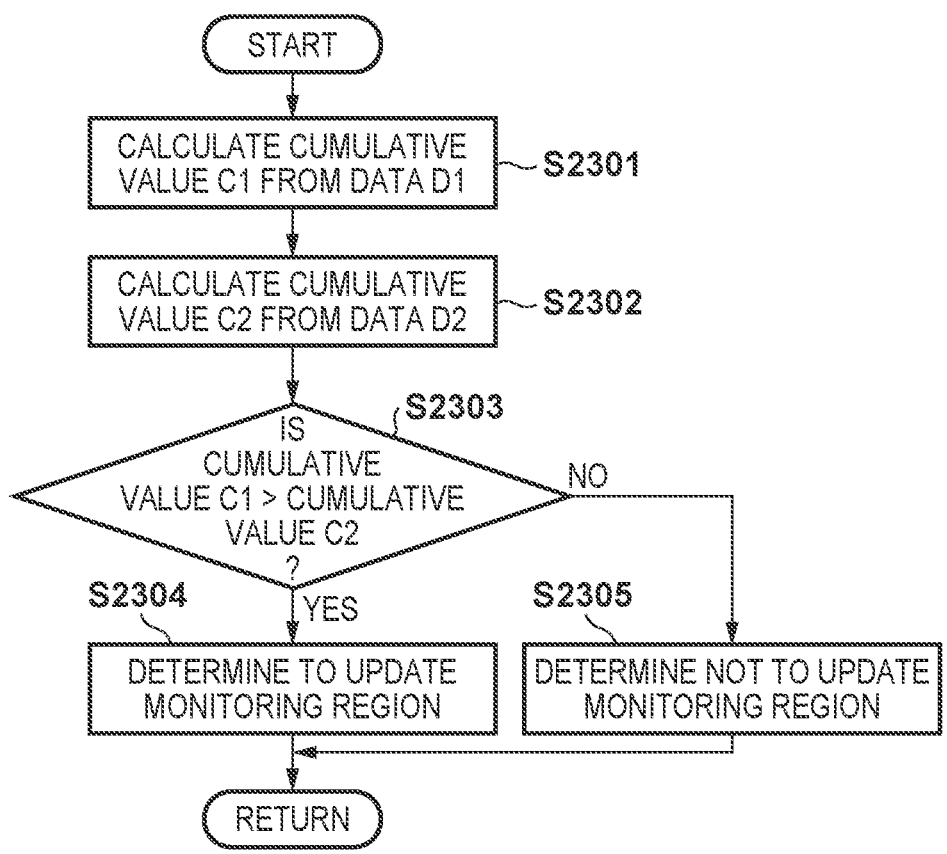
FIG. 11 is a flowchart illustrating a processing example of the processing unit.

FIG. 11 is a flowchart illustrating a processing example of the processing unit 101, and illustrates a specific processing example of S23 of FIG. 8.

In S2301, the processing unit 101 calculates a cumulative value C1 from the data D1. Specifically, the processing unit 101 calculates the cumulative value C1 of an angular difference in orientation from the immediately previous position in time series for the positions 970a to 975a and the intersection position 51a indicated by the data D1. Here, FIG. 7B is a diagram illustrating an angular difference between each position of the vehicle 9a and a previous position and a cumulative value of the angular difference.

For example, since the orientation of the vehicle 9a at the intersection position 51a and the positions 975a and 974a is 270°, an angular difference in orientation between the intersection position 51a and the position 975a and the previous position is 0°. For example, since the orientation of the vehicle 9a at the position 973a is 275°, an angular difference in orientation between the position 974a and the previous position is 5°. In this manner, the processing unit 101 calculates the angular difference in orientation between each of the positions 971a to 975a and the intersection position 51a and the immediately previous position in time series.

Next, the processing unit 101 acquires a cumulative value of an absolute value of the angular difference. More specifically, the processing unit 101 calculates the cumulative value C1 of the absolute value of the angular difference from the immediately previous position in time series with the intersection position 51a as the start point (FIG. 7B).

In S2302, the processing unit 101 calculates a cumulative value C2 from the data D2. Specifically, the processing unit 101 calculates the cumulative value C2 of an angular difference in orientation from the immediately previous position in time series for the positions 970b to 975b and an intersection position 51b indicated by the data D2. Here, FIG. 10B is a diagram illustrating an angular difference between each position of the vehicle 9b and a previous position and a cumulative value of the angular difference. The processing unit 101 calculates the cumulative value C2 of the absolute value of the angular difference from the immediately previous position in time series with the intersection position 51b as the start point by processing similar to the processing for the data D1 in S2301.

In S2303, the processing unit 101 checks whether or not the cumulative value C1>the cumulative value C2, and in a case where the cumulative value C1>the cumulative value C2, the processing unit 101 proceeds to S2304, and in a case where the cumulative value C1>the cumulative value C2 is not satisfied, the processing unit 101 proceeds to S2305.

In S2304, the processing unit 101 determines to update the monitoring region. In this case, once the processing unit 101 ends this flowchart and returns to the flowchart of FIG. 8, the processing unit 101 proceeds to "update" at the branch of S24, and thus the monitoring region is updated in S25. As a result, the monitoring region at the intersection position is updated from the monitoring region 991a to the monitoring region 991b. That is, the processing unit 101 sets the monitoring region based on the cumulative value.

In S2305, the processing unit 101 determines not to update the monitoring region. In this case, once the processing unit 101 ends this flowchart and returns to the flowchart of FIG. 8, the processing unit 101 proceeds to "not update" at the branch of S24, and thus, the data D2 is deleted in S26. As a result, the monitoring region 991a is maintained as the monitoring region at the intersection position.

As described above, in the present embodiment, it is determined whether or not to update the monitoring region based on the result of comparison of the cumulative values of the absolute values of the angular differences, starting from the intersection position. Therefore, it is possible to determine whether or not to update the monitoring region in consideration of the cumulative value of the absolute value of the angular difference. In a case where the cumulative value C2 acquired from the data D2 is smaller than the cumulative value C1 acquired from the data D1 in Steps S2303 to S2305, the processing unit 101 determines to update the monitoring region. Therefore, since the monitoring region is set based on the data whose cumulative value of the absolute value of the angular difference is small, the processing unit 101 can set a straight monitoring region.

Furthermore, from a certain aspect, the processing unit 101 determines whether or not to update the monitoring region based on a result of comparing changes of the orientations indicated by the data D1 and the data D2, respectively. Therefore, according to the embodiment, it is possible to determine whether or not to update the monitoring region in consideration of the change in orientation of the travel trajectory.

As described above, according to the present embodiment, since it is determined whether or not to update the monitoring region based on the result of comparison between the data D1 and the data D2, it is possible to set the monitoring region in driving assistance by using more accurate data.

Note that, in the present embodiment, the processing unit 101 determines whether or not to update the monitoring region based on the result of comparison between the entire data D1 and data D2. However, the processing unit 101 may determine whether or not to update the monitoring region based on a result of comparing data satisfying a predetermined condition among the data D1 and the data D2.

As an example of determining whether or not to update the monitoring region based on the result of comparing the data satisfying the predetermined condition, the processing unit 101 may determine whether or not to update the monitoring region based on a result of comparing the cumulative values for a position within a predetermined distance from the intersection position. Referring to FIGS. 6 and 9, the processing unit 101 may compare the cumulative values for a position that is more adjacent to the intersection position 51 than to an arc 300 whose radius around the intersection position 51 is a predetermined distance PD. Note that a value of the predetermined distance PD can be appropriately set in consideration of, for example, a communicable distance of vehicle-to-vehicle communication. Specifically, the predetermined distance PD may be in a range of several tens to several hundreds of meters, and more specifically, 200 m.

Specifically, the processing unit 101 calculates a distance between the position included in the data D1 and the data D2 and the intersection position 51, and compares the calculated distance with the predetermined distance PD. Then, the processing unit 101 calculates the cumulative value for a position that is within the predetermined distance PD from the intersection position 51.

In the data D1, since all the positions 970a to 975a are positioned within the predetermined distance from the intersection position 51, the processing unit 101 calculates the cumulative value of the angular difference starting from the intersection position 51 to the position 970a. In this case, the processing unit 101 calculates the cumulative value as 140°.

In the data D2, since the position 970b and the position 971b are not positioned within the predetermined distance from the intersection position 51, the processing unit 101 calculates the cumulative value of the angular difference starting from the intersection position 51 to the position 972b. In this case, the processing unit 101 calculates the cumulative value as 28°.

In this manner, by calculating the cumulative value of the angular difference between each position and the previous position for the region that is within the predetermined distance PD from the intersection position 51, a straighter monitoring region close to the intersection position 51 can be set. Therefore, it is possible to more appropriately perform driving assistance in the vicinity of the intersection position 51 where the necessity of the driving assistance is high.

As another example of determining whether or not to update the monitoring region based on the result of comparing the data satisfying the predetermined condition, the processing unit 101 may calculate the cumulative values within a range in which the cumulative values do not exceed a threshold, and determine whether or not to update the monitoring region based on the result of comparing the cumulative values.

Specifically, the processing unit 101 compares the cumulative value of the angular difference between each position and the previous position, starting from the intersection position 51, with a threshold T0. Here, in a case where the threshold T0 is 135°, in the data D1, the cumulative value at the position 972a is less than the threshold T0, but the cumulative value at the position 971a exceeds the threshold T0. In this case, the processing unit 101 calculates the cumulative value C1 in the data D1 as 135° that is the threshold T0. On the other hand, in the data D2, the cumulative value at the position 971b does not exceed the threshold T0. Therefore, the processing unit 101 calculates the cumulative value C2 in the data D2 as 30°.

In this manner, by setting an upper limit in the calculation of the cumulative value, a calculation load at the time of calculating the cumulative value can be reduced.

4. Modification Examples (FIGS. 12 to 16)

Hereinafter, modification examples of the above-described embodiment will be described. Note that the same components as those in the above-described embodiment are denoted by the same reference signs, and descriptions thereof will be omitted.

4.1. Modification Example 1

Figure 12:
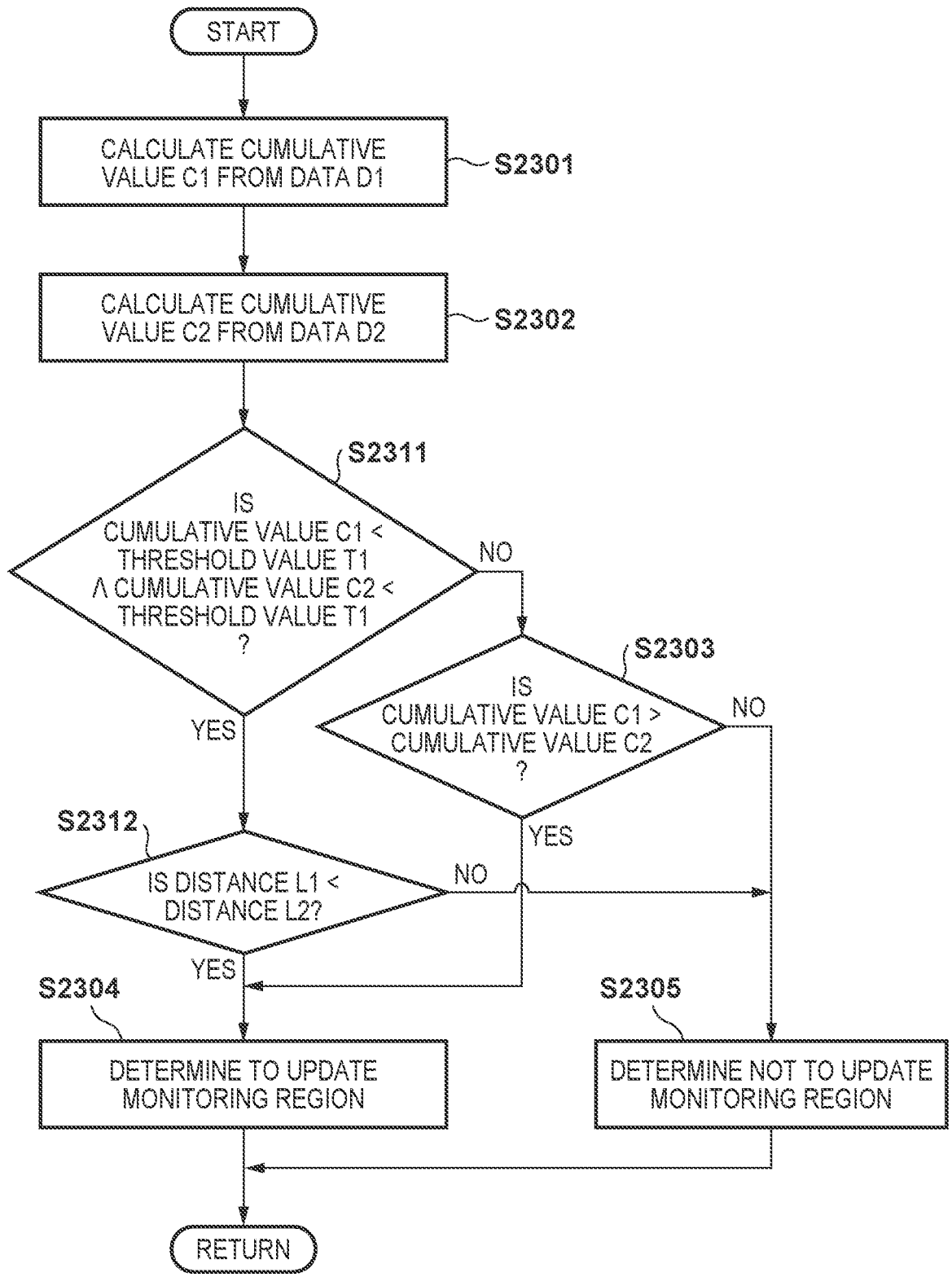
FIG. 12 is a flowchart illustrating a processing example of the processing unit.

FIG. 12 is a flowchart illustrating a processing example of the processing unit 101, and illustrates a specific processing example of S23 of FIG. 8. Note that S2301 to S2305 are processing similar to those in the flowchart of FIG. 11, and thus a description thereof is omitted. The processing unit 101 proceeds from S2302 to S2311.

In S2311, the processing unit 101 checks whether or not both of the cumulative value C1 and the cumulative value C2 are less than a threshold T1, and in a case where both of the cumulative value C1 and the cumulative value C2 are less than the threshold T1, the processing unit 101 proceeds to S2312, and in a case where not both of the cumulative value C1 and the cumulative value C2 are less than the threshold T1, the processing unit 101 proceeds to S2303.

In S2312, the processing unit 101 compares a distance L1 to the intersection position 51 of the travel trajectory 981a indicated by the data D1 with a distance L2 to the intersection position 51 of the travel trajectory 981b indicated by the data D2. Then, in a case where the distance L2 is larger than the distance L1, the processing unit 101 proceeds to S2304, and in a case where the distance L2 is not larger than the distance L1, the processing unit 101 proceeds to S2305.

As described above, in a case where both of the cumulative values acquired from the data D1 and the data D2 are equal to or less than the threshold, the processing unit 101 determines to update the monitoring region when the distance L2 is larger than the distance L1. As a result, in a case where the cumulative values based on the two pieces of data to be compared is within an allowable range, the processing unit 101 can set the monitoring region so that the distance of the monitoring region becomes larger.

4.2. Modification Example 2

FIG. 13 is a flowchart illustrating a processing example of the processing unit 101, and illustrates a specific processing example of S23 of FIG. 8. Note that S2304 to S2305 are processing similar to those in the flowchart of FIG. 11, and thus a description thereof is omitted.

FIG. 14A is a diagram illustrating the data D1 acquired from the vehicle 9a in the present modification example. The data D1 includes data indicating seven positions, and among them, the number of data indicating positions previous to the intersection position 51 is six. FIG. 14B is a diagram illustrating the data D2 acquired from the vehicle 9b in the present modification example. The data D2 includes data indicating seven positions, and the number of data indicating positions previous to the intersection position 51 is six.

In S2321, the processing unit 101 calculates the number N1 of positions at which the cumulative value does not exceed a threshold T2 based on the data D1. For example, in a case where the threshold value T2 is 135°, the cumulative value of the angular difference between the position 972a and the previous position is 110° and does not exceed the threshold, but the cumulative value of the angular difference between the position 971a and the previous position is 140° and exceeds the threshold. Therefore, the processing unit 101 calculates the number N1 of positions at which the cumulative value does not exceed the threshold T2 as five (the intersection position 51a and the positions 975a to 972a).

In S2322, the processing unit 101 calculates the number N2 of positions at which the cumulative value does not exceed the threshold T2 based on the data D2. For example, in a case where the threshold T2 is 135°, the cumulative value of the angular difference between the position 971b, which is the most previous position at which the cumulative value can be acquired, and the previous position is 30° and does not exceed the threshold. Therefore, the processing unit 101 calculates the number N2 of positions at which the cumulative value does not exceed the threshold T2 as six (the intersection position 51a and the positions 975b to 972b).

In S2323, the processing unit 101 proceeds to S2304 in a case where the number N2 is larger than the number N1, and proceeds to S2305 otherwise. That is, the processing unit 101 determines to update the monitoring region in a case where the number of positions at which the cumulative value is equal to or less than the threshold when starting from the intersection position 51 is larger in the data D2 than in the data D1. In the example of FIGS. 14A and 14B, since the number N1 is 5 and the number N2 is 6, the processing unit 101 proceeds to S2304 and determines to update the monitoring region.

As described above, when the travel history of the vehicle 9 shows that the vehicle 9 has traveled straight, the number of data included in the data and indicating a position at which the cumulative angle does not exceed the threshold increases. Therefore, in a case where the number N2 is larger than the number N1, the monitoring region is updated based on the data D2, such that the monitoring region can be set based on a straighter travel trajectory.

4.3. Modification Example 3

Figure 15:
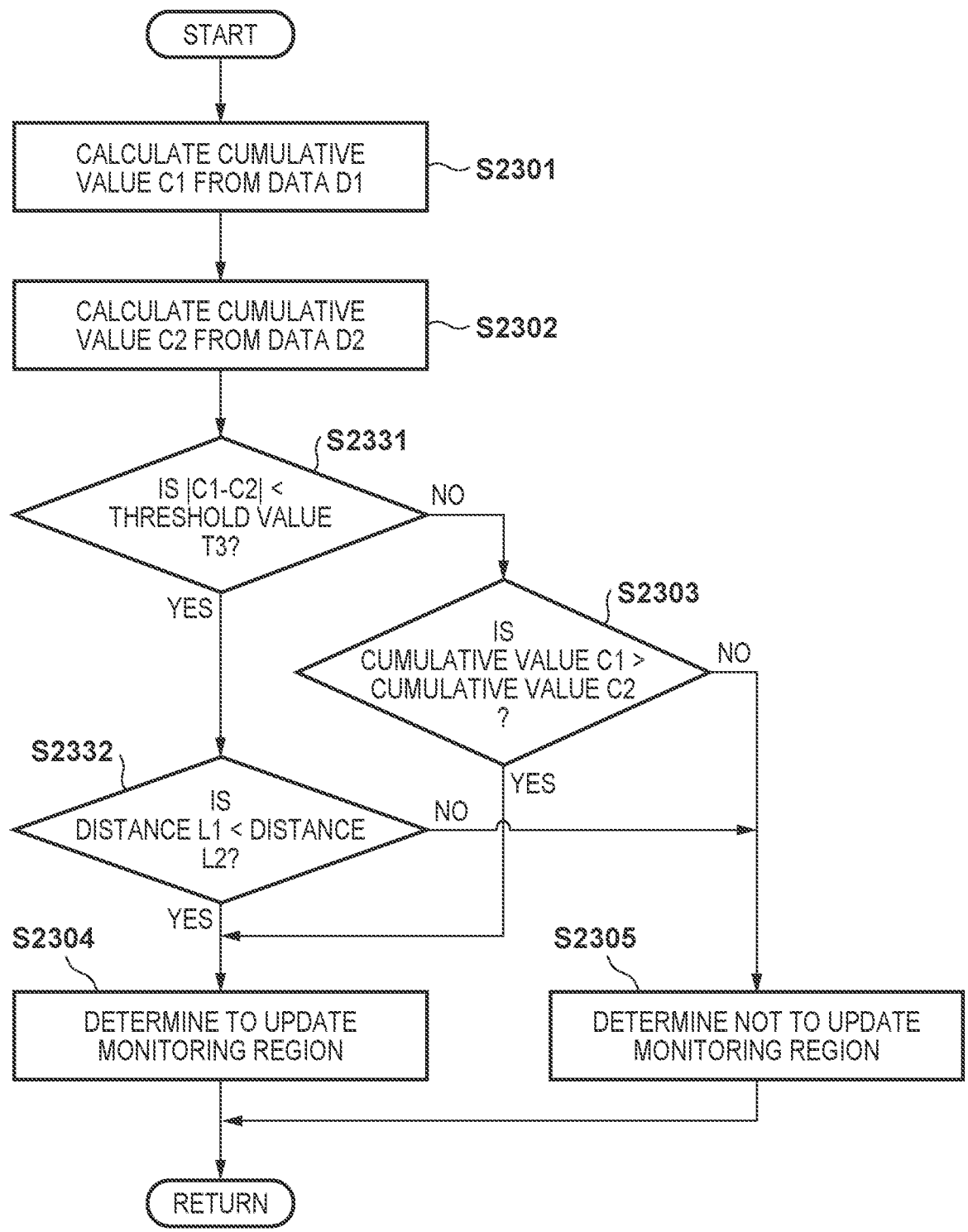
FIG. 15 is a flowchart illustrating a processing example of the processing unit.

FIG. 15 is a flowchart illustrating a processing example of the processing unit 101, and illustrates a specific processing example of S23 of FIG. 8. Note that S2301 to S2305 are processing similar to those in the flowchart of FIG. 11, and thus a description thereof is omitted.

In S2331, the processing unit 101 checks whether or not an absolute value of a difference between the cumulative value C1 and the cumulative value C2 is less than a threshold T3. In a case where the absolute value is less than the threshold T3, the processing unit 101 proceeds to S2332, and otherwise, the processing unit 101 proceeds to S2303. The threshold T3 can be set as appropriate, but may be set to a value within 30°, for example, or may be about 5°.

In S2332, the processing unit 101 compares the distance L1 to the intersection position 51 of the travel trajectory 981a indicated by the data D1 with the distance L2 to the intersection position 51 of the travel trajectory 981b indicated by the data D2. Then, in a case where the distance L2 is larger than the distance L1, the processing unit 101 proceeds to S2304, and in a case where the distance L2 is not larger than the distance L1, the processing unit 101 proceeds to S2305.

As described above, in a case where the difference between the cumulative values acquired from the data D1 and the data D2 is within a predetermined range, the processing unit 101 determines to update the monitoring region when the distance L2 is larger than the distance L1. As a result, the processing unit 101 can set the monitoring region so that the distance of the monitoring region becomes larger in a case where the difference between the cumulative values based on the two pieces of data to be compared is within the allowable range or a margin of error.

4.4. Modification Example 4

FIG. 16 is a flowchart illustrating a processing example of the processing unit 101, and illustrates a specific processing example of S23 of FIG. 8. Note that S2304 to S2305 are processing similar to those in the flowchart of FIG. 11, and thus a description thereof is omitted.

In S2351, the processing unit 101 acquires the number N10 of position data included in the data D1 and satisfying a predetermined condition. As an example, the processing unit 101 acquires the number N10 of data acquired during a predetermined period PT until a time point at which the vehicle 9 passes through the intersection position 51. That is, the predetermined condition may be that the time point associated with the position data is included in the predetermined period PT.

In S2352, the processing unit 101 acquires the number N20 of position data included in the data D2 and satisfying the predetermined condition. As an example, the processing unit 101 acquires the number N20 of data acquired during the predetermined period PT until the time point at which the vehicle 9 passes through the intersection position 51. That is, the predetermined condition may be that the time point associated with the position data is included in the predetermined period PT.

In S2353, the processing unit 101 checks whether or not the acquired numbers N10 and N20 satisfy an update condition. In a case where the update condition is satisfied, the processing unit 101 proceeds to S2304, and in a case where the update condition is not satisfied, the processing unit 101 proceeds to S2305. As an example, in a case where the predetermined condition in S2351 and S2352 is that the time point associated with the position data is included in the predetermined period PT, the update condition may be that the number N20 is smaller than the number N10.

In this manner, the processing unit 101 determines whether or not to update the monitoring region based on a result of comparing the number N20 of data included in the data D2 and indicating the position acquired during the predetermined period PT with the number N10 of data included in the data D1 and indicating the position acquired during the predetermined period PT. More specifically, the processing unit 101 determines to update the monitoring region in a case where the number N20 is smaller than the number N10. In a case where the position and the orientation are acquired at a shorter time interval when the vehicle 9 travels on a curve than when the vehicle 9 travels straight, the straighter the travel trajectory is, the smaller the number of data indicating the position acquired during the predetermined period PT is. Therefore, the processing unit 101 can update the monitoring region so that the monitoring region becomes straighter by determining whether or not to update the monitoring region based on the update condition.

Note that the predetermined condition in S2351 and S2352 can be set as appropriate. For example, the predetermined condition may be that the position indicated by the data is included in a predetermined region PR within a predetermined distance from the intersection position 51. That is, the processing unit 101 may determine whether or not to update the monitoring region based on a result of comparing the number N20 of data indicating a position acquired in the predetermined region PR included in the data D2 and the number N10 of data indicating a position acquired in the predetermined region PR included in the data D1. More specifically, the processing unit 101 may determine to update the monitoring region in a case where the number of data N20 included in the data D2 and indicating the position acquired in the predetermined region PR is smaller than the number of data N10 included in the data D1 and indicating the position acquired in the predetermined region PR. In a case where the position and the orientation are acquired at a shorter time interval when the vehicle 9 travels on a curve than when the vehicle 9 travels straight, the straighter the travel trajectory is, the smaller the number of data indicating the position acquired in the predetermined region PR is. Therefore, the processing unit 101 can update the monitoring region so that the monitoring region becomes straighter by determining whether or not to update the monitoring region based on the update condition.

In addition, in a case where the numbers N10 and N20 of data satisfying the predetermined condition are the same, the processing unit 101 determines to update the monitoring region in a case where an average of distances of adjacent positions is larger in the data D2 than in the data D1. In a case where the position and the orientation are acquired at a shorter time interval when the vehicle 9 travels on a curve than when the vehicle 9 travels straight, an interval between positions indicated by position data tends to be larger when the vehicle 9 travels straight than when the vehicle 9 travels on a curve. Therefore, in a case where the numbers N10 and N20 of data satisfying the predetermined condition are the same, the processing unit 101 can update the monitoring region so that the monitoring region becomes straighter by comparing the average distances of the adjacent positions.

In addition, the processing unit 101 can set the monitoring region based on the predetermined period PT or the predetermined region PR by determining whether or not to update the monitoring region based on the update condition described above.

5. Other Embodiments

The execution of the above-described monitoring region setting processing or monitoring region update processing may be limited according to the surrounding situation of the vehicle 1 or the like. For example, even in a case where the travel trajectories of the vehicle 1 and the vehicle 9 based on the position information such as latitude and longitude intersect, it is conceivable that the necessity of travel assistance is low at an intersection where a traffic light is present, a grade separated intersection, or the like. Therefore, in a case where the processing unit 101 recognizes a traffic signal or a grade-separated intersection based on the detection result of the outside detection sensor such as a camera, the processing unit 101 may restrict the execution of the monitoring region setting processing or the monitoring region update processing. In addition, in a case where the position information of the vehicle 1 and the vehicle 9 includes information regarding the height, the processing unit 101 may recognize that the intersection is a grade separated intersection from a difference in height between the vehicle 1 and the vehicle 9 and restrict the execution of the monitoring region setting processing or the monitoring region update processing. As a result, the calculation load of the processing unit 101 can be reduced.

Whether or not to perform the above-described monitoring region setting processing or monitoring region update processing may be determined based on whether or not the vehicle 1 is traveling on a preferential road. For example, in a case where the vehicle 1 temporarily stops before the intersection position 51, the processing unit 101 may perform the setting processing or update processing. That is, in a case where the processing unit 101 recognizes that the vehicle 1 is traveling on a road that is not the preferential road, the processing unit 101 may perform the monitoring region setting processing or monitoring region update processing, and otherwise, the processing unit 101 may restrict the execution of the monitoring region setting processing or monitoring region update processing.

In the above-described embodiment, in a case where the monitoring region 99 has already been set, it is determined whether or not to update the monitoring region 99. However, under a predetermined condition, a plurality of monitoring regions may be set for the same intersection position 5. For example, in a case of proceeding to Yes at the branch of S22, the processing unit 101 may check the degree of overlapping between the travel trajectory 98 used to set the existing monitoring region 99 and the travel trajectory 98 newly obtained from another vehicle traveling in the monitoring region 99. Then, in a case where the degree of overlapping is equal to or higher than a predetermined value, the processing unit 101 may set the monitoring region 99 based on the travel trajectory 98 newly obtained from another vehicle traveling in the monitoring region 99 without deleting the existing monitoring region 99. That is, the processing unit 101 may set a plurality of monitoring regions for another vehicle entering the same intersection position 5 at the same azimuth. In this case, a plurality of pieces of information having different monitoring region IDs but having the same intersection ID may be registered in the monitoring region DB 1022.

Further, in the above-described embodiment, the control device 10 functioning as the driving assistance device is mounted on the four-wheeled vehicle 1, but the control device 10 may be mounted on another type of vehicle capable of traveling on a road, such as a straddled vehicle or a work machine.

6. Summary of Embodiments

The embodiments described above disclose at least the following driving assistance device, vehicle, and driving assistance method.

1. A driving assistance device (10) in the above embodiments comprises:

an acquisition unit (101, S10) configured to acquire data regarding a travel trajectory of another vehicle from the other vehicle by vehicle-to-vehicle communication;

a specifying unit (101, S12) configured to specify an intersection position between the travel trajectory of the other vehicle and a travel trajectory of a self-vehicle based on the data acquired by the acquisition unit;

a setting unit (101, S15) configured to set, in a case where the intersection position is specifiable by the specifying unit, a region based on the intersection position and the travel trajectory of the other vehicle as a monitoring region when performing driving assistance; and a determination unit (101, S23) configured to determine, in a case where the acquisition unit acquires the data from another vehicle traveling in the monitoring region in a state in which the monitoring region is set, whether or not to update the monitoring region based on a result of comparison between first data that is the data used to set the monitoring region and second data that is the data acquired from the other vehicle traveling in the monitoring region, wherein the setting unit updates the monitoring region based on the second data in a case where the determination unit determines to update the monitoring region (S25).

According to this embodiment, since the determination unit determines whether or not to update the monitoring region based on the result of comparison between the first data and the second data, it is possible to appropriately set the monitoring region in the driving assistance.

2. According to the above embodiments, the data includes data indicating a position and an orientation at the position of the other vehicle in time series, and the determination unit determines whether or not to update the monitoring region based on a result of comparing changes of the orientations indicated by the first data and the second data, respectively (S2304).

According to this embodiment, it is possible to determine whether or not to update the monitoring region in consideration of the change in orientation of the travel trajectory.

3. According to the above embodiments, the determination unit acquires an angular difference in orientation between each position indicated by the first data and the second data and an immediately previous position in time series (S2301, S2302), and determines whether or not to update the monitoring region based on a result of comparing cumulative values of absolute values of the angular differences starting from the intersection position (S2303, S2304).

According to this embodiment, the determination unit can determine whether or not to update the monitoring region in consideration of the cumulative value of the absolute value of the angular difference.

4. According to the above embodiments, the determination unit determines to update the monitoring region in a case where the cumulative value acquired from the second data is smaller than the cumulative value acquired from the first data (S2303, S2304).

According to this embodiment, since the monitoring region is set based on data whose cumulative value of the absolute value of the angular difference is small, it is possible to set a straight monitoring region.

5. According to the above embodiments, the determination unit determines, in a case where both of the cumulative values acquired from the first data and the second data are equal to or less than a threshold, to update the monitoring region when a distance to the intersection position of the travel trajectory indicated by the second data is larger than a distance to the intersection position of the travel trajectory indicated by the first data (S2312, S2304).

According to this embodiment, the setting unit can set the monitoring region so that the distance of the monitoring region becomes larger.

6. According to the above embodiments, the data indicating the position and the orientation of the other vehicle at the position in time series is data regarding the position and the orientation acquired at a shorter time interval when the other vehicle travels on a curve than when the other vehicle travels straight, and the determination unit determines to update the monitoring region in a case where the number of positions at which the cumulative value is equal to or less than a threshold when starting from the intersection position is larger in the second data than in the first data (S2323, S2304).

According to this embodiment, since the data is acquired at a short time interval when traveling on a curve, the number of data (the number of positions) is larger when traveling on a curve. Therefore, the determination unit determines to update the monitoring region in a case where the number of positions based on the second data is small, such that the setting unit can set a straighter monitoring region.

7. According to the above embodiments, the setting unit sets the monitoring region based on the cumulative value (S25).

According to this embodiment, the setting unit can set the monitoring region based on the cumulative value.

8. According to the above embodiments, the determination unit determines whether or not to update the monitoring region based on a result of comparing the cumulative values for a position within a predetermined distance from the intersection position (S25).

According to this embodiment, the determination unit can perform the determination according to the straightness of the travel trajectory within a predetermined distance.

9. According to the above embodiments, the determination unit calculates the cumulative values within a range in which the cumulative values do not exceed a threshold, and determines whether or not to update the monitoring region based on a result of comparing the cumulative values (S25).

According to this embodiment, it is possible to suppress unnecessary calculation of the cumulative value.

10. According to the above embodiments, the determination unit determines, in a case where a difference between the cumulative values acquired from the first data and the second data is within a predetermined range, to update the monitoring region when a distance to the intersection position of the travel trajectory indicated by the second data is larger than a distance to the intersection position of the travel trajectory indicated by the first data (S2331~S2332).

According to this embodiment, in a case where a difference in range of the cumulative value is within a predetermined range, the determination unit can perform the determination so that the distance of the monitoring region becomes larger.

11. According to the above embodiments, the first data and the second data include data indicating a position of the other vehicle and an orientation at the position in time series, and the determination unit determines whether or not to update the monitoring region based on a result of comparison between the number of data included in the second data and indicating the position acquired during a predetermined period until a time point at which the other vehicle passes through the intersection position and the number of data included in the first data and indicating the position acquired during the predetermined period (S2351~S2353).

According to this embodiment, the determination unit can perform the determination based on the travel trajectory within the predetermined period until the other vehicle reaches the intersection position.

12. According to the above embodiments, the data indicating the position of the other vehicle and the orientation at the position in time series is data regarding the position and the orientation acquired at a shorter time interval when the other vehicle travels on a curve than when the other vehicle travels straight, and the determination unit determines to update the monitoring region in a case where the number of data included in the second data and indicating the position acquired during the predetermined period until the time point at which the other vehicle passes through the intersection position is smaller than the number of data included in the first data and indicating the position acquired during the predetermined period (S2351~S2353).

According to this embodiment, the determination unit can perform the determination so that the monitoring region is set using data regarding a straighter travel trajectory within the predetermined period until the other vehicle reaches the intersection position.

13. According to the above embodiments, the first data and the second data include data indicating a position of the other vehicle and an orientation at the position in time series, and the determination unit determines whether or not to update the monitoring region based on a result of comparison between the number of data included in the second data and indicating the position of the other vehicle acquired in a predetermined region within a predetermined distance from the intersection position and the number of data included in the first data and indicating the position acquired in the predetermined region (S2351~S2353).

According to this embodiment, the determination can be performed based on the travel trajectory in the predetermined region until the other vehicle reaches the intersection position.

14. According to the above embodiments, the data indicating the position and the orientation at the position of the other vehicle in time series is data regarding the position and the orientation acquired at a shorter time interval when the other vehicle travels on a curve than when the other vehicle travels straight, and the determination unit determines to update the monitoring region in a case where the number of data included in the second data and indicating the position acquired in the predetermined region is smaller than the number of data included in the first data and indicating the position acquired in the predetermined region (S2351~S2353).

According to this embodiment, the determination unit can perform the determination so that the monitoring region is set using data regarding a straighter travel trajectory within the predetermined region until the other vehicle reaches the intersection position.

15. According to the above embodiments, in a case where the numbers of data to be compared included in the first data and the second data and indicating the positions are the same, the determination unit determines to update the monitoring region when an average of distances of adjacent positions calculated based on the data to be compared indicating the positions is larger in the second data than in the first data.

According to this embodiment, since the average distance of adjacent positions is larger when the vehicle travels straight than when the vehicle travels on a curve, the determination unit can perform the determination so that the monitoring region is set using data regarding a straighter travel trajectory.

16. According to the above embodiments, the setting unit sets the monitoring region based on the predetermined period (S25).

According to this embodiment, the setting unit can set the monitoring region based on the travel trajectory within the predetermined period until the other vehicle reaches the intersection position.

17. According to the above embodiments, the setting unit sets the monitoring region based on the predetermined region (S25).

According to this embodiment, the setting unit can set the monitoring region based on the travel trajectory within the predetermined region until the other vehicle reaches the intersection position.

18. According to the above embodiments, the driving assistance of the self-vehicle is performed without using map information.

According to this embodiment, it is possible to perform the driving assistance based on travel data of the self-vehicle and travel data acquired from another vehicle by vehicle-to-vehicle communication without using map information.

19. A vehicle (1) in the above embodiments mounts the driving assistance device according to the above embodiments.

According to this embodiment, there is provided a vehicle on which the driving assistance device capable of setting the monitoring region in the driving assistance by using more accurate data is mounted.

20. A driving assistance method in the above embodiments comprises:
acquiring (S10) data regarding a travel trajectory of another vehicle from the other vehicle by vehicle-to-vehicle communication;
specifying (S12) an intersection position between the travel trajectory of the other vehicle and a travel trajectory of a self-vehicle based on the data acquired in the acquiring;
setting (S15), in a case where the intersection position is specifiable in the specifying, a region based on the intersection position and the travel trajectory of the other vehicle as a monitoring region when performing driving assistance; and
updating (S25) the monitoring region based on a result of comparison between first data that is data used to set the monitoring region and second data that is data newly acquired in the acquiring from the other vehicle that has passed through a predetermined region based on the intersection position.

According to this embodiment, it is possible to set the monitoring region in the driving assistance by using more accurate data.

The invention is not limited to the foregoing embodiments, and various variations/changes are possible within the spirit of the invention.

What is claimed is:

1. A driving assistance device mounted on a first vehicle comprising:
a vehicle-to-vehicle communication module; and
a processor and a storage device, the storage device storing a program executable by the processor to perform:
acquiring first data regarding a second travel trajectory of a second vehicle from the second vehicle by vehicle-to-vehicle communication, the first data including a plurality of positions and a plurality of orientations of the second vehicle in a time series;
specifying an intersection position between the second travel trajectory of the second vehicle and a first travel trajectory of the first vehicle based on the first data acquired;
setting, in a case where the intersection position is specified, a region along the second travel trajectory to be monitored when performing driving assistance;
operating a device of the first vehicle as the driving assistance based on a possibility of a collision between the first vehicle and a third vehicle in the region;
acquiring second data regarding a fourth travel trajectory of a fourth vehicle, which travels in the region, from the fourth vehicle by vehicle-to-vehicle communication, the second data including a plurality of positions and a plurality of orientations of the fourth vehicle in the time series;
determining whether or not to update the region to be monitored based on a result of comparison between a change of the orientations of the second vehicle based on the first data and a change of the orientations of the fourth vehicle based on the second data, and
updating the region to be monitored with an additional region along the fourth travel trajectory when it is determined to update the region to be monitored in the determining,
wherein in the determining,
a plurality of first angular differences in the orientations of the second vehicle are calculated based on the first data, each first angular difference being between each position of the second vehicle and an immediately previous position of the second vehicle in the time series,
a plurality of second angular differences in the orientations of the fourth vehicle are calculated based on the second data, each second angular difference being between each position of the fourth vehicle and an immediately previous position of the fourth vehicle in the time series, and
determining whether to update the region to be monitored based on a result of comparing a first cumulative value of a plurality of absolute values of the first angular differences starting from the intersection position and a second cumulative value of a plurality of absolute values of the second angular differences.

2. The driving assistance device according to claim 1, wherein in the determining, it is determined to update the region to be monitored in a case where the second cumulative value is smaller than the first cumulative value.

3. The driving assistance device according to claim 1, wherein in the determining, it is determined whether or not to update the region to be monitored based on a result of comparing the first cumulative value and the second cumulative value within a predetermined distance from the intersection position.

4. The driving assistance device according to claim 3, wherein in the determining, the first cumulative value and the second cumulative value are calculated within a range in which each of the first cumulative value and the second cumulative value do not exceed a threshold.

5. The driving assistance device according to claim 1, wherein the driving assistance of the first vehicle is performed without using map information.

6. A vehicle on which the driving assistance device according to claim 1 is mounted.

7. The driving assistance device according to claim 1, wherein in the determining, it is determined to update the region to be monitored when the fourth travel trajectory is straighter than the second travel trajectory based on the result of the comparison.

8. The driving assistance device according to claim 1, wherein the device operated in the operating is a braking device of the first vehicle.

9. The driving assistance according to claim 1, wherein the acquiring of the second data, the determining and the updating are performed when the first vehicle travels on a road including the intersection position again after the region to be monitored in the setting.

10. A driving assistance method for a first vehicle comprising:
   acquiring first data regarding a second travel trajectory of a second vehicle from the second vehicle by vehicle-to-vehicle communication, the first data including a plurality of positions and a plurality of orientations of the second vehicle in a time series;
   specifying an intersection position between the second travel trajectory of the second vehicle and a first travel trajectory of the first vehicle based on the first data acquired in the acquiring;
   setting, in a case where the intersection position is specified, a region along the second travel trajectory to be monitored when performing driving assistance;
   operating a device of the first vehicle as the driving assistance based on a possibility of a collision between the first vehicle and a third vehicle in the region;
   acquiring second data regarding a fourth travel trajectory of a fourth vehicle, which travels in the region, from the fourth vehicle by vehicle-to-vehicle communication, the second data including a plurality of positions and a plurality of orientations of the fourth vehicle in the time series;
   determining whether or not to update the region to be monitored based on a result of comparison between a change of the orientations of the second vehicle based on the first data and a change of the orientations of the fourth vehicle based on the second data; and
   updating the region to be monitored with an additional region along the fourth travel trajectory when it is determined to update the region to be monitored in the determining
   wherein in the determining,
      a plurality of first angular differences in the orientations of the second vehicle are calculated based on the first data, each first angular difference being between each position of the second vehicle and an immediately previous position of the second vehicle in the time series,
      a plurality of second angular differences in the orientations of the fourth vehicle are calculated based on the second data, each second angular difference being between each position of the fourth vehicle and an immediately previous position of the fourth vehicle in the time series, and
   determining whether to update the region to be monitored based on a result of comparing a first cumulative value of a plurality of absolute values of the first angular differences starting from the intersection position and a second cumulative value of a plurality of absolute values of the second angular differences.

* * * * *